US012706777B2

(12) United States Patent
Li et al.

(10) Patent No.: US 12,706,777 B2
(45) Date of Patent: Aug. 11, 2026

(54) VXLAN PACKET TRANSMISSION METHOD, NETWORK DEVICE, AND SYSTEM

(71) Applicant: Huawei Technologies Co., Ltd., Shenzhen (CN)

(72) Inventors: Zhenbin Li, Beijing (CN); Shaowei Liu, Leuven (BE); Shuanglong Chen, Beijing (CN); Jun Li, Nanjing (CN); Haibo Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 38 days.

(21) Appl. No.: 18/757,058

(22) Filed: Jun. 27, 2024

(65) Prior Publication Data

US 2024/0348476 A1 Oct. 17, 2024

Related U.S. Application Data

(63) Continuation of application No. PCT/CN2022/143276, filed on Dec. 29, 2022.

(30) Foreign Application Priority Data

Dec. 31, 2021 (CN) ........................ 202111672776.4
Mar. 8, 2022 (CN) ........................ 202210228141.3

(51) Int. Cl.
*H04L 12/46* (2006.01)
*H04L 45/741* (2022.01)

(52) U.S. Cl.
CPC ........ *H04L 12/4633* (2013.01); *H04L 45/741* (2013.01)

(58) Field of Classification Search
CPC . H04L 12/4633; H04L 12/4641; H04L 12/46; H04L 45/741; H04L 69/22
See application file for complete search history.

(56) References Cited

U.S. PATENT DOCUMENTS

2015/0200806 A1* 7/2015 Donley .................. H04L 45/74 370/392
2016/0323184 A1* 11/2016 Li ...................... H04L 12/4633
(Continued)

FOREIGN PATENT DOCUMENTS

CN 105591874 A 5/2016
CN 105721359 A 6/2016
(Continued)

OTHER PUBLICATIONS

C. Bao, et al, "IPv6 Addressing of IPV4/IPv6 Translators", Internet Engineering Task Force (IETF), ISSN: 2070-1721, RFC6052, Oct. 2010, total 18 pages.
(Continued)

*Primary Examiner* — Richard G Keehn
(74) *Attorney, Agent, or Firm* — Slater Matsil, LLP

(57) ABSTRACT

This application discloses a VXLAN packet transmission method, a network device, and a system. After receiving a first packet, a first network device obtains a VNI corresponding to the first packet. The first network device encapsulates the VNI in an IPV6 header by encapsulating the IPV6 header in the first packet, to obtain a second packet. The first network device sends the second packet to a second network device, so that the second network device forwards the packet based on the VNI included in the IPV6 header. In this application, the IPV6 header is used to carry the VNI, and no additional UDP header needs to be encapsulated to carry the VNI.

20 Claims, 15 Drawing Sheets

(56) References Cited

U.S. PATENT DOCUMENTS

| | | | |
|---|---|---|---|
| 2017/0250907 | A1 | 8/2017 | Pignataro et al. |
| 2017/0289031 | A1* | 10/2017 | Duda .................. H04L 12/4633 |
| 2017/0317919 | A1 | 11/2017 | Fernando et al. |
| 2018/0139073 | A1* | 5/2018 | Han .................... H04L 12/4633 |
| 2020/0099610 | A1 | 3/2020 | Heron et al. |
| 2020/0267022 | A1* | 8/2020 | Duan .................. H04L 12/4633 |
| 2020/0389426 | A1* | 12/2020 | Enguehard .............. H04L 63/20 |
| 2022/0345984 | A1 | 10/2022 | Patel et al. |
| 2023/0089240 | A1 | 3/2023 | Huang et al. |
| 2024/0235994 | A1 | 7/2024 | He et al. |
| 2024/0348476 | A1 | 10/2024 | Li et al. |

FOREIGN PATENT DOCUMENTS

| | | | | | |
|---|---|---|---|---|---|
| CN | 106330714 | A | | 1/2017 | |
| CN | 109688057 | A | | 4/2019 | |
| CN | 110557316 | A | | 12/2019 | |
| CN | 109218158 | B | * | 5/2021 | ........... H04L 47/125 |
| CN | 112929284 | A | | 6/2021 | |
| CN | 113114576 | A | | 7/2021 | |
| CN | 113472650 | A | | 10/2021 | |
| WO | 2015136875 | A1 | | 9/2015 | |
| WO | WO-2018109536 | A1 | * | 6/2018 | ............. H04L 43/00 |
| WO | 2020225092 | A1 | | 11/2020 | |
| WO | 2021047317 | A1 | | 3/2021 | |
| WO | 2021129023 | A1 | | 7/2021 | |

OTHER PUBLICATIONS

M. Mahalingam et al, “Virtual extensible Local Area Network (VXLAN): A Framework for Overlaying Virtualized Layer 2 Networks over Layer 3 Networks”, ISSN: 2070-1721, RFC7348, Aug. 2014, total 22 pages.

* cited by examiner

| Locator (locator) | Function (function) | Parameter (argument)/Padding (padding) (optional) |
|---|---|---|

VXLAN PACKET TRANSMISSION METHOD, NETWORK DEVICE, AND SYSTEM

CROSS-REFERENCE TO RELATED APPLICATIONS

This application is a continuation of International Application No. PCT/CN2022/143276, filed on Dec. 29, 2022, which claims priority to Chinese Patent Application No. 202210228141.3, filed on Mar. 8, 2022, and Chinese Patent Application No. 202111672776.4, filed on Dec. 31, 2021. All of the aforementioned applications are hereby incorporated by reference in their entireties.

TECHNICAL FIELD

This application relates to the field of communication technologies, and in particular, to a virtual extensible local area network (VXLAN) packet transmission method, a network device, and a system.

BACKGROUND

A VXLAN is an overlay network technology. A layer 2 Ethernet tunnel can be established on a layer 3 network, to implement cross-region layer 2 interconnection. In the VXLAN technology, an encapsulation format in which an original Ethernet packet is encapsulated in a user datagram protocol (UDP) data packet is used, and an original layer 2 data frame and a VXLAN header are together encapsulated in the UDP data packet. Because the UDP is used as a transmission method at an outer layer, the original Ethernet packet may be transmitted on the layer 2 or layer 3 network. The VXLAN header includes a VXLAN identifier (VNI), and the VNI occupies 24 bits in the data packet. Therefore, 16 million VXLANs can coexist, and tenants may be deployed in large scale.

With development and deployment of an internet protocol version 6 (IPv6) technology, traffic of different tenants may need to traverse an IPV6 network. Therefore, it is urgent to deploy the VXLAN technology on the IPV6 network. However, because the UDP encapsulation is used in the VXLAN, encapsulation efficiency in the IPV6 network is low, and packet transmission efficiency is affected.

SUMMARY

This application provides a VXLAN packet transmission method, a network device, and a system, to reduce an amount of data for packet encapsulation when a VXLAN packet passes through an IPV6 network, improve packet encapsulation efficiency, and further improve packet transmission efficiency.

According to a first aspect of this application, a VXLAN packet transmission method is provided. The method includes: A first network device receives a first packet, and obtains a VNI based on the first packet. The first network device encapsulates an IPV6 header in the first packet to obtain a second packet. The IPV6 header carries the VNI. The first network device sends the second packet to a second network device. It may be learned that, after obtaining the VNI corresponding to the first packet, the first network device encapsulates the IPV6 header in the first packet, and includes the VNI in the IPV6 header. No additional UDP header needs to be encapsulated to carry the VNI. This reduces an amount of data for packet encapsulation, and improves packet encapsulation efficiency. In addition, by including the VNI in the IPV6 header, a method for the VXLAN packet to traverse an IPV6 network is provided. In this method, there is no need to use the UDP header to carry the VNI. Because the IPV6 header is a basic packet encapsulation manner when the packet is forwarded on the IPV6 network, this method improves flexibility of VXLAN packet encapsulation.

In a possible implementation, a manner in which the IPV6 header carries the VNI may be adding the VNI to the IPV6 header, or may be encapsulating a VXLAN header in the IPV6 header.

In a possible implementation, the IPV6 header is an IPV6 basic header. The IPV6 basic header includes basic packet forwarding information, for example, includes a source address field and a destination address field. The source address field is used to carry a source address of the packet, and the destination address field is used to carry a destination address of the packet.

In a possible implementation, the VNI is carried in the destination address field of the IPV6 basic header. Because the destination address field of the IPV6 basic header is 128 bits (bits), prefix information or SRv6 locator used for packet forwarding in a packet forwarding process usually occupies a part of the 128 bits, for example, occupies only first 64 bits. In this way, the VNI is included in a bit that is not occupied by the prefix information or the SRv6 locator and that is in the destination address field, and the destination address field of the IPV6 basic header is multiplexed. No additional header needs to be encapsulated to carry the VNI. This improves packet encapsulation efficiency.

In a possible implementation, the 65th bit to the 128th bit in the destination address field carry the VNI.

In a possible implementation, the destination address field includes a VXLAN header, and the VXLAN header carries the VNI. Because the VXLAN header occupies 64 bits, the VXLAN header may be completely carried in the destination address field. In addition to the VNI, the VXLAN header further includes some pieces of indication information used for VXLAN packet forwarding. The complete VXLAN header is carried in the destination address field, so that reliability of the packet forwarding is improved.

In a possible implementation, the 65th bit to the 128th bit in the destination address field carry the VXLAN header.

In a possible implementation, the destination address in the destination address field indicates the second network device to forward the packet based on the VNI information carried in the destination address field.

In a possible implementation, the IPV6 header is an IPV6 extension header, and the IPv6 extension header includes a destination option header (DOH) or a segment routing header (SRH). Optionally, that the first network device encapsulates an IPV6 header in the first packet to obtain a second packet includes: The first network device encapsulates the IPV6 extension header and the IPV6 basic header in the first packet. The IPV6 extension header carries the VNI, and the IPV6 basic header is used for packet forwarding.

In a possible implementation, the DOH includes a type-length-value (type-length-value, TLV), and a type field of the TLV indicates that the DOH carries the VNI.

In a possible implementation, the DOH is used to carry the VNI, or the DOH is used to carry a VXLAN header, and the VXLAN header carries the VNI.

In a possible implementation, the VNI is carried in a segment identifier (SID) list (SID list) of the SRH. Optionally, the VNI is carried in a SID corresponding to the second network device in the SID list. In an application scenario of IPv6 forwarding plane-based segment routing (SRv6), when a part or all of a path needs to be explicitly specified, the SRH may be pushed into the packet, to indicate an explicit path by using the SID list in the SRH. A length of each SID in the SID list is defined to be 128 bits. Information about a SID used for packet forwarding in a packet forwarding process is usually only a part of the 128 bits, or a SID advertised by the network device may be a compressed SID, which occupies only a part of the 128 bits, for example, occupies only 64 bits. In this way, the VNI is included in a bit that is not occupied and that is in the SID of the second network device in the SID list, and the segment identifier list in the segment routing header of the IPV6 extension header is multiplexed. No additional header needs to be encapsulated to carry the VNI. This improves packet encapsulation efficiency.

In a possible implementation, the SID of the second network device includes a VXLAN header, and the VXLAN header carries the VNI.

In a possible implementation, the SID of the second network device indicates the second network device to forward the packet based on the VNI carried in the SID. After receiving the second packet, the second network device determines, based on the SID carried in the second packet, that the second network device is an end node on the explicit path, and forwards the packet based on the VNI in the second packet. The SID of the second network device includes a locator field and a function field. Optionally, the SID of the second network device may further include a parameter field.

In a possible implementation, the VNI is carried in the function field of the SID of the second network device.

In a possible implementation, the function field in the SID of the second network device includes a VXLAN header, and the VXLAN header carries the VNI.

In a possible implementation, a flow label (flow label) in the IPV6 header carries a port number corresponding to the VXLAN packet.

In a possible implementation, the port number is used to perform load balance processing in a forwarding process of the second packet, or the port number is used to determine that the second packet includes the VXLAN packet.

In a possible implementation, a source port number of the VXLAN packet is obtained through calculation based on a payload of the VXLAN packet, for example, obtained by performing hash on the payload of the VXLAN packet by using a hash algorithm. A value of the port number obtained from the VXLAN packet may be carried in the flow label of the second packet. A method for calculating a value of the flow label of the second packet is the same as a method for calculating a UDP source port number used for load balance in the VXLAN packet. That is, the port number carried in the flow label is also obtained through calculation based on a payload in the first packet, to ensure that a load balance effect implemented in the forwarding process of the second packet is consistent with a load balance effect implemented by using a UDP source port number of a conventional VXLAN packet.

In a possible implementation, the IPV6 header further includes VXLAN flags (flags), and the VXLAN flags include a flag indicating that the second packet carries a valid VNI.

In a possible implementation, the IPV6 header carries a VXLAN header, and the VXLAN header carries the VNI.

In a possible implementation, a next header (Next Header) of the IPV6 header indicates that a next header adjacent to the IPV6 header in the second packet is an Ethernet header. The IPV6 header is used to carry the VNI, and there is no need to use a UDP header to carry the VNI in the packet. Therefore, the next header of the IPV6 header is set to an Ethernet (ETH) type. Therefore, packet processing efficiency in the forwarding process of the second packet can be improved.

In a possible implementation, that a first network device obtains a VNI based on the first packet includes: The first network device obtains the VNI based on an interface for receiving the first packet. The VNI corresponds to the interface for receiving the first packet.

According to a second aspect of this application, a VXLAN packet transmission method is provided. The method includes: A second network device receives a second packet from a first network device. The second packet is encapsulated with an IPV6 header, and the IPv6 header carries a VNI. The second network device obtains the VNI from the IPV6 header. The second network device decapsulates the second packet to obtain a first packet. The first packet does not include the IPV6 header. The second network device forwards the first packet based on the VNI.

In a possible implementation, a manner in which the IPV6 header carries the VNI may be adding the VNI to the IPV6 header, or may be encapsulating a VXLAN header in the IPV6 header, where the VXLAN header includes the VNI.

In a possible implementation, the IPV6 header is an IPV6 basic header.

In a possible implementation, the VNI is carried in a destination address field of the IPv6 basic header.

In a possible implementation, the destination address field includes a VXLAN header, and the VXLAN header carries the VNI.

In a possible implementation, the 65th bit to the 128th bit in the destination address field carry the VNI.

In a possible implementation, the 65th bit to the 128th bit in the destination address field carry the VXLAN header.

In a possible implementation, that the second network device obtains the VNI from the IPV6 header includes: The second network device determines that the destination address field includes an address of the second network device. The second network device obtains the VNI from the destination address field in response to determining that the destination address field includes the address of the second network device.

In a possible implementation, before the second network device receives the second packet from the first network device, the method further includes: The second network device advertises the address of the second network device to the first network device, to indicate the first network device to include a VNI of a VXLAN packet sent to the second network device in the address of the second network device.

In a possible implementation, the IPV6 header is an IPV6 extension header, and the IPv6 extension header includes a DOH or an SRH.

In a possible implementation, the DOH includes a TLV, and a type field of the TLV indicates that the DOH carries the VNI.

In a possible implementation, the DOH includes a VXLAN header, and the VXLAN header carries the VNI.

In a possible implementation, the VNI is carried in a SID list of the SRH.

In a possible implementation, the VNI is carried in a SID corresponding to the second network device in the SID list of the SRH.

In a possible implementation, the SID of the second network device includes a VXLAN header, and the VXLAN header carries the VNI.

In a possible implementation, that the second network device obtains the VNI from the IPV6 header includes: The second network device determines that the destination address field of the second packet includes the SID of the second network device. The second network device obtains the VNI from the SID of the second network device in response to determining that the destination address field of the second packet includes the SID of the second network device.

In a possible implementation, a type of the SID of the second network device is a virtual network endpoint (Endpoint with decapsulation and VXLAN table lookup use, END.VN) type. The SID is an SRv6 SID. A locator part of the SID includes an address of a VXLAN tunnel endpoint (VTEP) of the VXLAN packet, and a function part of the SID includes the VXLAN header. Forwarding actions corresponding to a behavior (behavior) of the SID include: After receiving the packet, a destination VTEP node obtains a corresponding VXLAN instance forwarding table based on the VNI in the SID of the packet, decapsulates the packet, searches the forwarding table based on a MAC address and the like in the payload, and forwards the packet. The decapsulating the packet includes: removing the IPV6 basic header encapsulated in the second packet to obtain the first packet, or removing the IPV6 basic header and the IPV6 extension header encapsulated in the second packet to obtain the first packet.

Optionally, a SID corresponding to the address of the second network device is a SID of END.VN type.

Optionally, the SID corresponding to the address of the second network device is an SRv6 locator of the second network device.

In a possible implementation, before the second network device receives the second packet from the first network device, the method further includes: The second network device advertises the SID of the second network device to the first network device, to indicate the first network device to include the VNI of the VXLAN packet sent to the second network device in the SID of the second network device.

In a possible implementation, the method further includes: The second network device establishes a forwarding entry. The forwarding entry includes the SID of the second network device. The second network device decapsulates the second packet based on the forwarding entry to obtain the first packet, and forwards the first packet based on the VNI.

In a possible implementation, a flow label in the IPV6 header carries a port number corresponding to the VXLAN packet. Optionally, the port number is used to perform load balance processing in a forwarding process of the second packet.

In a possible implementation, the IPV6 header further includes VXLAN flags, and the VXLAN flags include a flag indicating that the second packet carries a valid VNI.

According to a third aspect of this application, a first network device is provided, and is configured to perform the method according to any one of the first aspect or the possible implementations of the first aspect. Specifically, the first network device includes a unit configured to perform the method according to any one of the first aspect or the possible designs of the first aspect.

According to a fourth aspect of this application, a second network device is provided, and is configured to perform the method according to any one of the second aspect or the possible implementations of the second aspect. Specifically, the second network device includes a unit configured to perform the method according to any one of the second aspect or the possible designs of the second aspect.

According to a fifth aspect of this application, a network system for VXLAN packet transmission is provided. The network system includes a first network device and a second network device. The first network device is configured to perform the method according to any one of the first aspect or the possible designs of the first aspect. The second network device is configured to perform the method according to any one of the second aspect or the possible designs of the second aspect.

According to a sixth aspect of this application, a network device is provided. The device includes a processor and a memory. The memory is configured to store instructions or program code. The processor is configured to execute the instructions or the program code in the memory, so that the network device performs the method according to any one of the first aspect or the possible designs of the first aspect, or performs the method according to any one of the second aspect or the possible designs of the second aspect.

According to a seventh aspect of this application, a computer-readable storage medium is provided. The computer-readable storage medium stores instructions. When the instructions are run on a processor, a computer or a network device is enabled to perform the method according to any one of the first aspect or the possible designs of the first aspect, or perform the method according to any one of the second aspect or the possible designs of the second aspect.

According to an eighth aspect of this application, a computer program product is provided. The computer program product includes a program. When the program is run on a processor, a computer or a network device is enabled to perform the method according to any one of the first aspect or the possible designs of the first aspect, or perform the method according to any one of the second aspect or the possible designs of the second aspect.

According to a ninth aspect of this application, a chip is provided, and includes an interface circuit and a processor. The interface circuit is connected to the processor. The processor is configured to enable the chip to perform the method according to any one of the first aspect or the possible designs of the first aspect, or perform the method according to any one of the second aspect or the possible designs of the second aspect.

BRIEF DESCRIPTION OF THE DRAWINGS

To illustrate technical solutions in embodiments of this application or in an existing technology more clearly, the following briefly introduces the accompanying drawings used for describing embodiments or the existing technology. It is clear that the accompanying drawings in the following descriptions show merely some embodiments recorded in this application, and persons of ordinary skill in the art may still derive other drawings from these accompanying drawings without creative efforts.

DETAILED DESCRIPTION OF ILLUSTRATIVE EMBODIMENTS

To make persons skilled in the art better understand solutions provided in this application, the following clearly describes the technical solutions in embodiments of this application with reference to the accompanying drawings in embodiments of this application. It is clear that the described embodiments are merely some but not all of embodiments of this application.

Before specific technical solutions are described, key terms and technologies in embodiments of this application are first described.

Figure 1A:
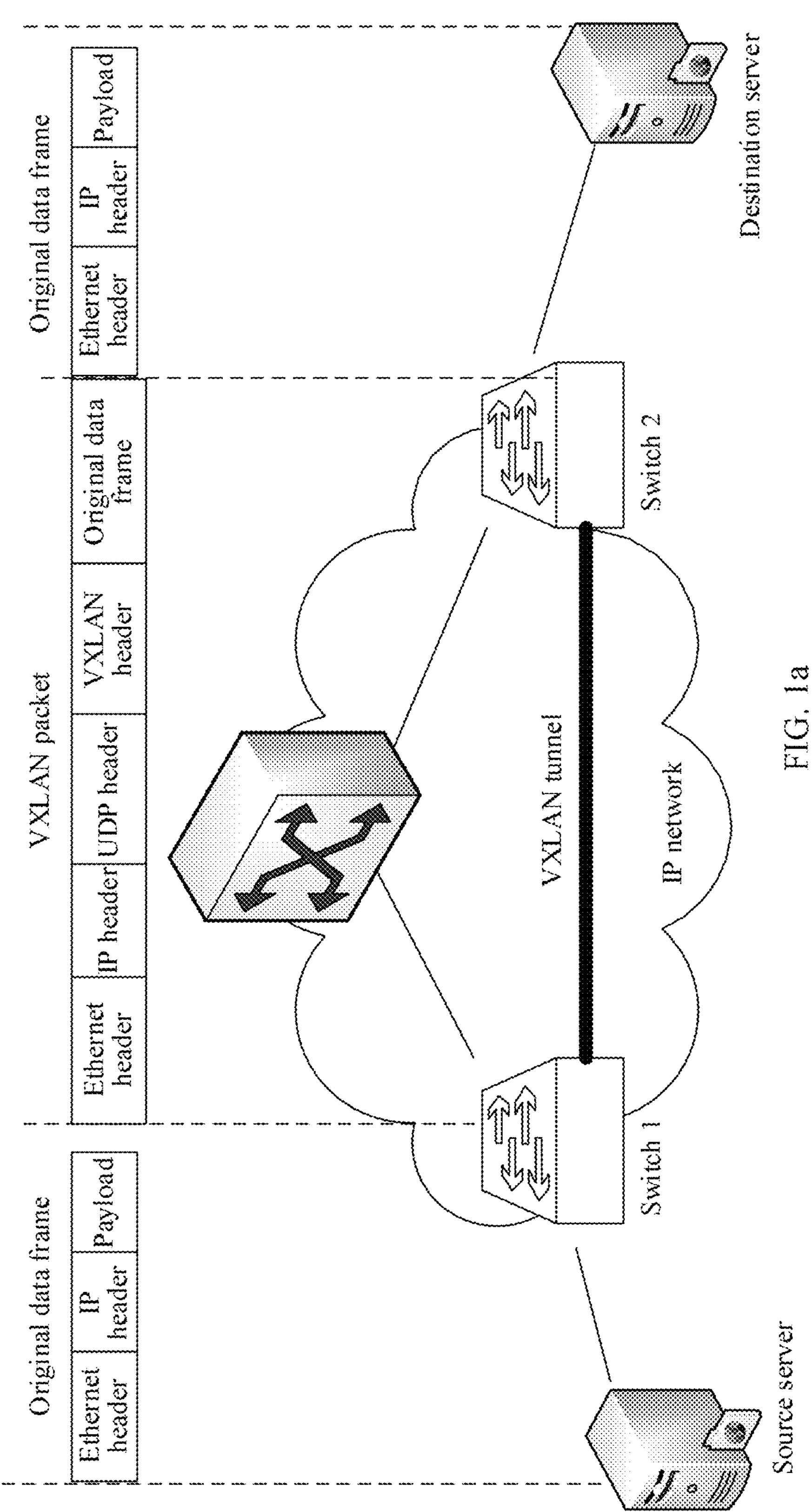
FIG. 1*a* is a schematic diagram of a VXLAN network application scenario according to an embodiment of this application.

A VXLAN is a virtual tunnel communication technology. A logical tunnel is established on an internet protocol (IP) network between a source network device and a destination network device, and a user-side packet is forwarded through the tunnel after specific encapsulation. For example, as shown in FIG. 1*a*, a tunnel is established between two switches through the VXLAN. A switch 1 encapsulates an original data frame sent by a source server, so that the original data frame can be transmitted on a bearer network. After reaching a switch 2 connected to a destination server, the original data frame leaves the VXLAN tunnel, and is restored and forwarded to the destination server.

In a VXLAN network, devices that encapsulate and decapsulate the original data frame are VTEPs. The VTEPs are edge devices of the VXLAN network, and are a start point and an end point of the VXLAN tunnel. As shown in FIG. 1*a*, the switch 1 and the switch 2 are VTEPs. The VTEP may be an independent network device, or may be a virtual switch in a server. The original data frame sent by the source server is encapsulated as a packet in a VXLAN format on the VTEP, and is transmitted to the other VTEP in the IP network. The original data frame is restored through decapsulation, and is finally forwarded to the destination server.

A VNI is similar to a virtual local area network (VLAN) identifier (ID), and is used to distinguish VXLAN segments. Virtual machines at different VXLAN segments cannot directly communicate with each other at layer 2. The VNI may also be understood as a user identifier. A VNI represents a tenant, and tenants belonging to different VNIs cannot directly communicate with each other at layer 2. As shown in FIG. 1*a*, when a VXLAN packet is encapsulated, 24-bit length space is allocated to the VNI, so that the VNI can support isolation of massive tenants. Specifically, the VTEP encapsulates a VXLAN header, a UDP header, an outer IP header, and an outer media access control (MAC) header in original data frame sent by the source server.

Figure 1B:
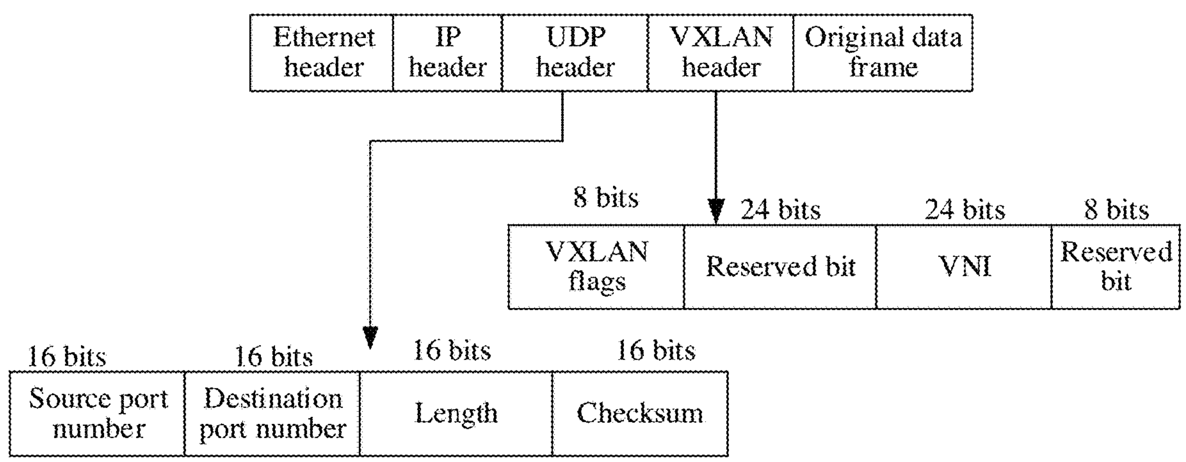
FIG. 1*b* is a schematic diagram of a structure of VXLAN packet encapsulation according to an embodiment of this application.

FIG. 1*b* is a schematic diagram of a structure including the VXLAN header and the UDP header. A length of the VXLAN header is 8 bytes, including a 24-bit VNI field for carrying VNIs of different tenants in the VXLAN network. In addition, a VXLAN flags field and two reserved fields are further included. The VXLAN flags field occupies 8 bits, and a value may be 00001000. The two reserved fields occupy 24 bits and 8 bits respectively.

The VXLAN header and the original data frame are together used as UDP data. The UDP header occupies 8 bytes. The UDP header includes a source port number, a destination port number, a UDP length, and a UDP checksum. Each field occupies 16 bits. Optionally, the destination port number (Dest Port) is fixed at 4789, and the source port number (Source Port) is determined by performing a hash algorithm on the original data frame.

A source IP address field in the outer IP header carries an IP address of the VTEP connected to the source server, and a destination IP address field is an IP address of the VTEP connected to the destination server. The outer IP header includes an outer internet protocol version 4 (IPv4) header or an outer IPv6 header. The outer IPv6 header may also be referred to as an IPV6 basic header. A source address field and a destination address field in the IPV6 basic header each occupy 128 bits.

The outer MAC header is an encapsulated outer Ethernet header. A source MAC address field carries a MAC address of the VTEP connected to the source server, and a destination MAC address field is a MAC address of a next-hop device on a path to the destination VTEP.

It may be learned from the foregoing descriptions that, when the VXLAN packet is transmitted in an IPV6 network, if the VXLAN header is encapsulated in a UDP encapsulation manner, an additional UDP header needs to be encapsulated. As a result, an amount of encapsulated data is large, encapsulation efficiency is low, and packet transmission efficiency is affected.

Based on this, an embodiment of this application provides a VXLAN packet transmission method. When a VXLAN packet is transmitted in an IPV6 network, a VNI corresponding to the packet is encapsulated in an IPV6 header, and no additional UDP header needs to be encapsulated. This improves encapsulation efficiency.

To facilitate understanding of the technical solutions provided in embodiments of this application, the following describes the technical solutions with reference to the accompanying drawings.

Figure 2:
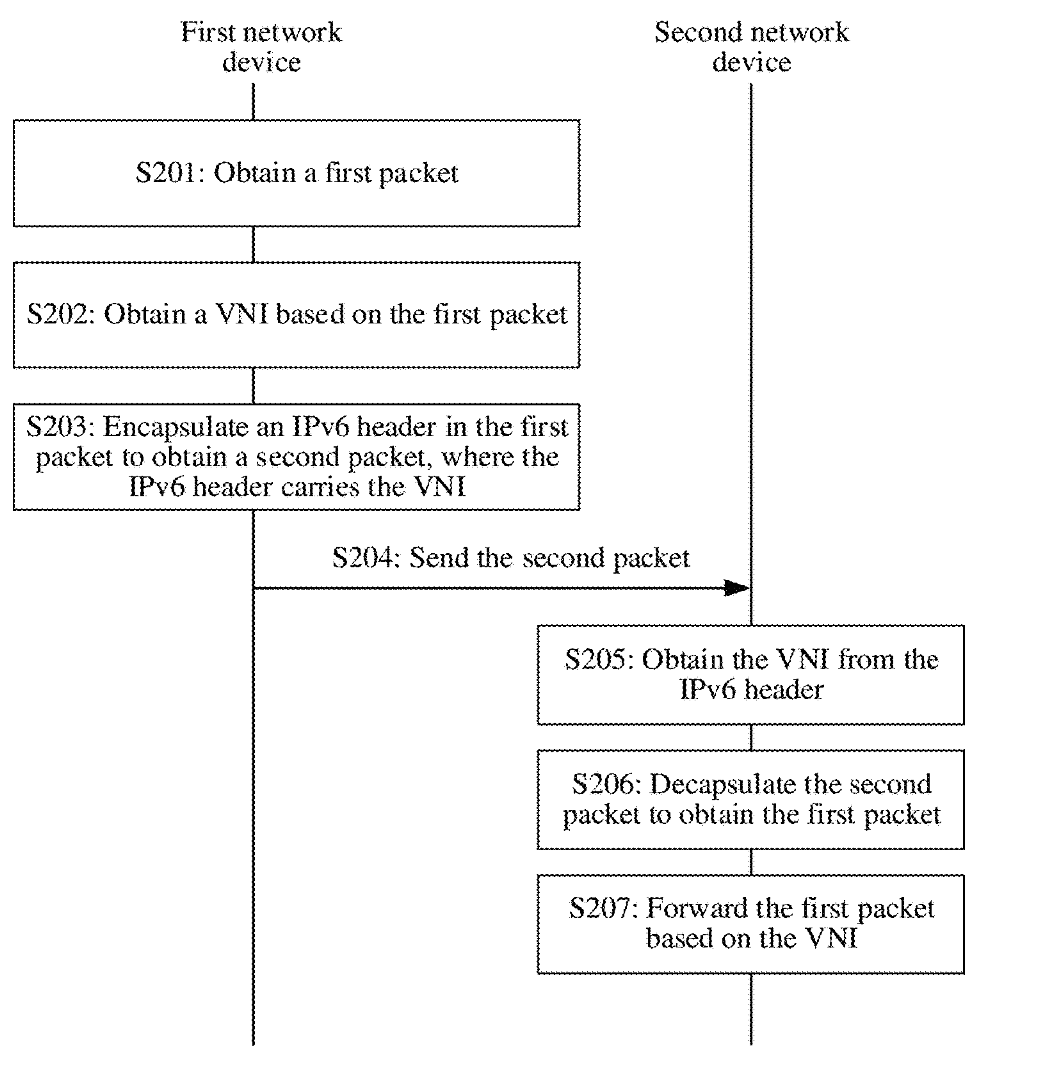
FIG. 2 is a flowchart of a VXLAN packet transmission method according to an embodiment of this application.

FIG. 2 is a flowchart of a VXLAN packet transmission method according to an embodiment of this application. As shown in FIG. 2, the method includes the following steps.

S201: A first network device obtains a first packet.

S202: The first network device obtains a VNI based on the first packet.

In this embodiment, the first network device may be the switch 1 in FIG. 1*a*. The first network device may receive the first packet sent by a host or the source server in FIG. 1*a*, or the first network device generates the first packet. After the first packet is obtained, the VNI corresponding to the first packet is obtained based on the first packet. The VNI is a tenant identifier corresponding to a device that sends the first packet. Specifically, after receiving the first packet, the first network device may obtain, based on an interface for receiving the first packet, the VNI corresponding to the first packet. The VNI corresponds to the interface for receiving the first packet. For example, the VNI may be preconfigured on the interface of the first network device. After receiving the first packet through the interface, the first network device obtains the VNI based on the correspondence between the interface and the VNI. Alternatively, after receiving the first packet, the first network device may obtain, based on an address (a source address) in the first packet, the VNI corresponding to the first packet. For example, the correspondence between the address and the VNI is preconfigured on the first network device. After receiving the first packet, the first network device determines, based on the address of the first packet and the correspondence, the VNI corresponding to the address.

S203: The first network device encapsulates an IPV6 header in the first packet to obtain a second packet.

After determining the VNI corresponding to the first packet, the first network device encapsulates the IPV6 header in the first packet, where the VNI is carried in the IPV6 header, to obtain the second packet. There are two manners in which the IPV6 header carries the VNI. In one manner, the IPV6 header directly carries the VNI. In the other manner, the IPV6 header includes a VXLAN header, and the VXLAN header includes the VNI. Optionally, the IPV6 header is an IPV6 basic header or an IPV6 extension header, and the VNI may be carried in the IPV6 basic header or the IPV6 extension header. Alternatively, the VXLAN header may be carried in the IPV6 basic header or the IPV6 extension header. The IPV6 basic header includes basic packet forwarding information, and a length is 40 bytes.

(1) The IPV6 header is the IPV6 basic header.

When the IPV6 header is the IPV6 basic header, the VNI may be carried in a destination address field of the IPV6 basic header. Usually, a length of the destination address field in the IPV6 basic header is 128 bits, and the field is used to carry an address of a destination network device. Optionally, in a packet forwarding process, prefix information of the destination network device usually does not need to occupy the entire destination address field. For example, the prefix information of the destination network device needs to occupy only 64 bits of the destination address field. Optionally, the address of the destination network device may be compressed to 64 bits, and occupies the 1st bit to the 64th bit. In this way, the VNI may occupy the 65th bit to the 128th bit in the destination address field. Alternatively, the VNI may occupy the 80th bit to the 128th bit in the destination address field. A location occupied by the VNI in the destination address field may be determined based on an actual application situation. This is not limited in this embodiment.

Figure 3A:
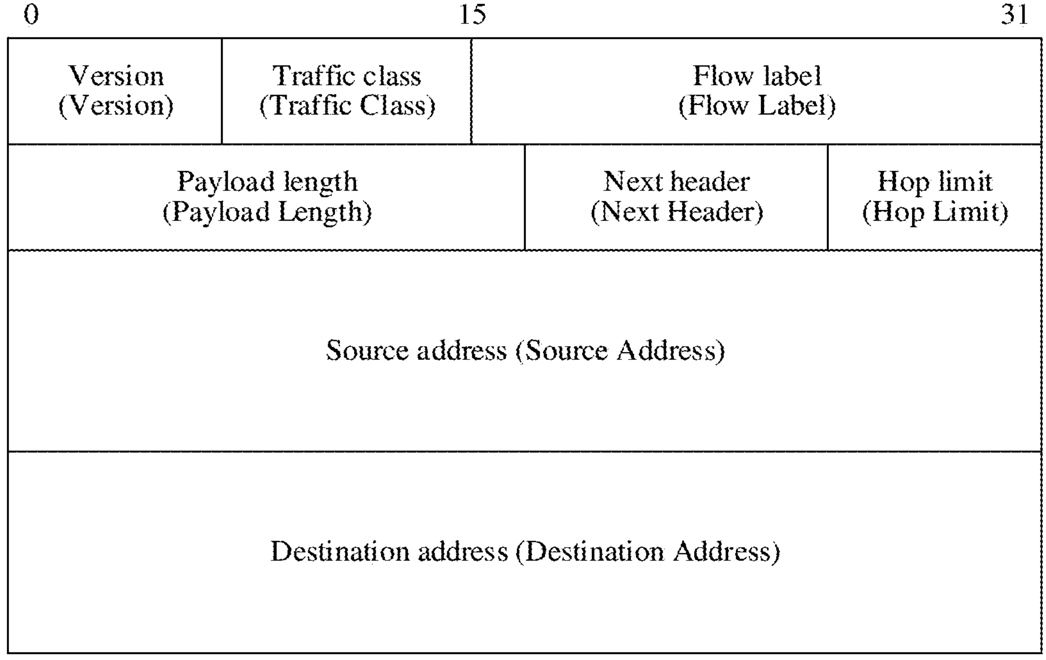
FIG. 3*a* is a schematic diagram of a format of an IPV6 basic header according to an embodiment of this application.

FIG. 3*a* shows a packet format of the IPV6 basic header. The IPV6 basic header includes a version field, a traffic type field, a flow label field, a payload length field, a next header field, a hop limit field, a source address (SA) field, and a destination address (DA) field. The source address field and the destination address field each occupy 128 bits. The source address field carries a source address, and the destination address field carries a destination address.

Figure 3B:
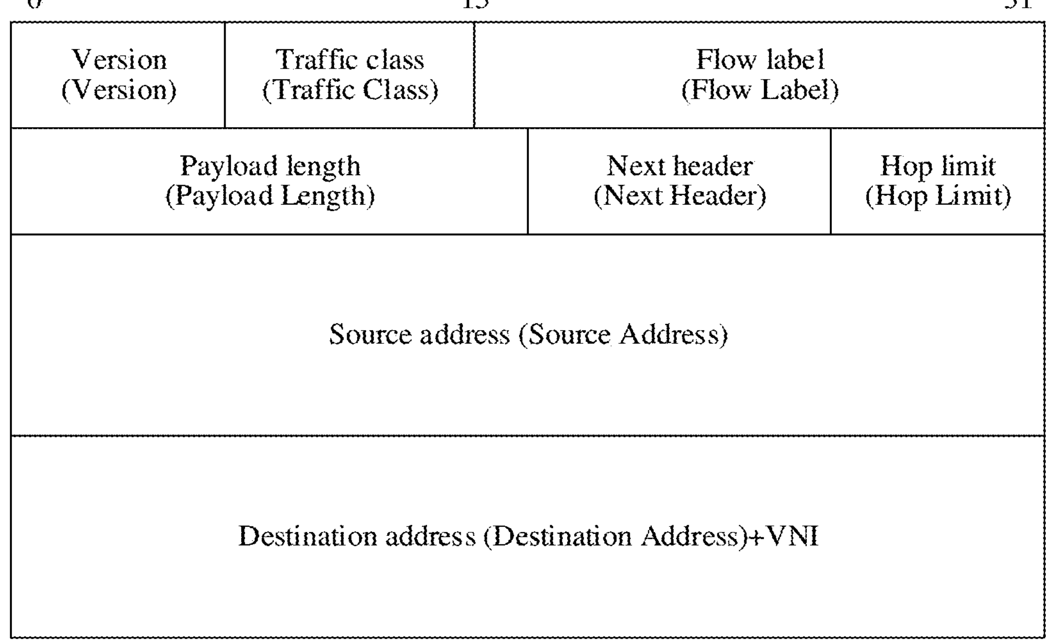
FIG. 3*b* is a schematic diagram of encapsulating a VNI in a destination address field according to an embodiment of this application.

Optionally, the destination address field may include the destination address and the VNI, as shown in FIG. 3*b*.

Figure 3C:
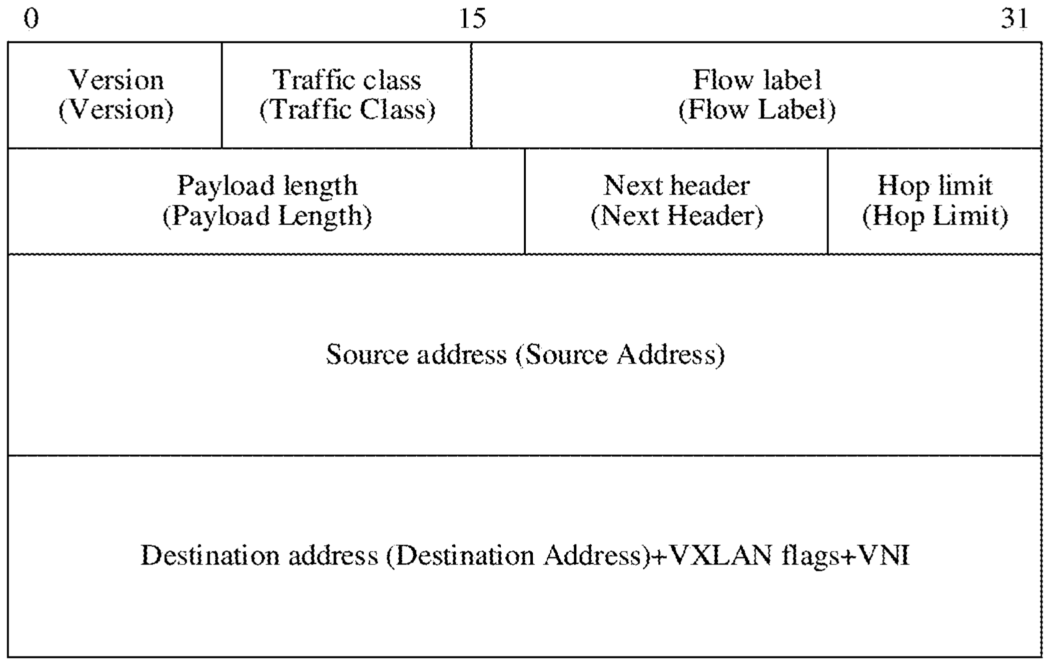
FIG. 3*c* is another schematic diagram of encapsulating a VNI in a destination address field according to an embodiment of this application.

In addition, the IPV6 header may further include VXLAN flags, and the VXLAN flags include a flag indicating that the second packet carries a valid VNI. A length of the VXLAN flags is 8 bits, and the 5th bit indicates that the packet carries the valid VNI. For example, when the 5th bit is 1, it indicates that the second packet carries the valid VNI. The VXLAN flags may be carried in the destination address field. As shown in FIG. 3*c*, the destination address field includes the destination address, the VXLAN flags, and the VNI.

Figure 3D:
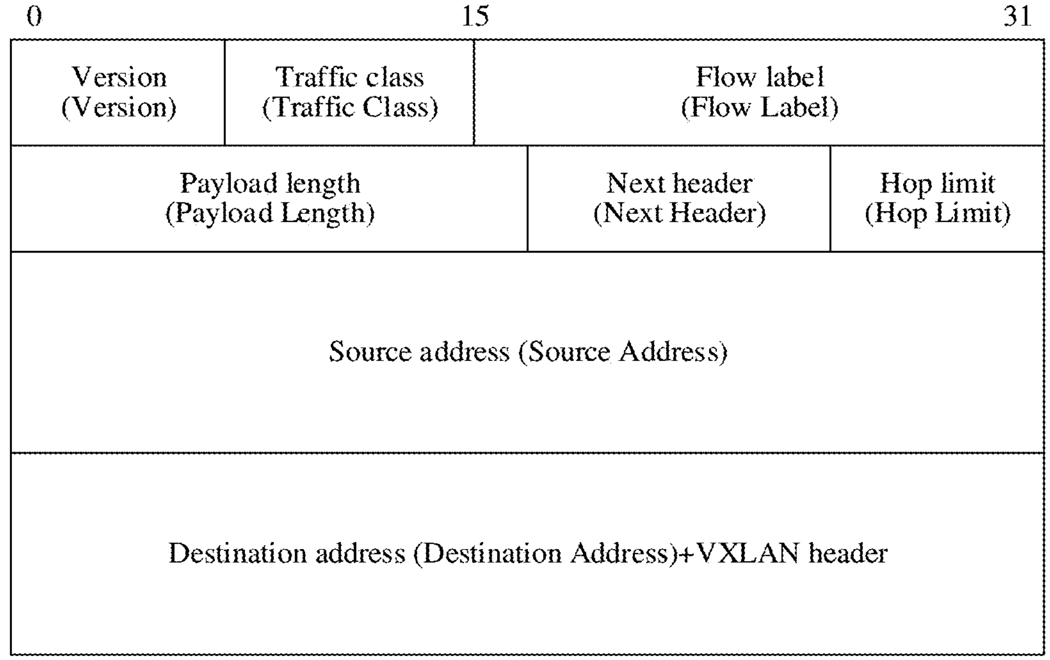
FIG. 3*d* is still another schematic diagram of encapsulating a VNI in a destination address field according to an embodiment of this application.

For the VNI carried in the destination address field of the IPV6 basic header, there is another carrying manner. To be specific, the destination address field includes the VXLAN header, and the VXLAN header carries the VNI. That is, the VXLAN header is encapsulated in the destination address field of the IPV6 basic header. A length of the VXLAN header is 64 bits. The destination address usually occupies the 1st bit to the 64th bit in the destination address field. In this case, the VXLAN header may be located in the 65th bit to the 128th bit in the destination address field, as shown in FIG. 3*d*. The VXLAN header includes the VXLAN flags. To be specific, the destination address field in the IPV6 basic header includes the destination address and the VXLAN header, and the VXLAN header includes the VNI and the VXLAN flags, as shown in FIG. 3*d*.

The destination address field is usually used to carry the destination address of the packet. After receiving the packet, the destination network device indicated by the destination address reads the destination address from the destination address field, and forwards the packet based on the destination address. In this embodiment, the destination address field includes not only the destination address, but also the VNI. The VNI indicates the destination network device to forward the packet. To enable the destination network device to forward the packet based on the VNI after receiving the packet, the device (a second network device) indicated by the destination address in the destination address field needs to be notified in advance to forward the second packet based on the VNI carried in the destination address field after receiving the packet.

(2) The IPV6 header is the IPV6 extension header.

Optionally, when encapsulating the IPV6 header in the first packet, the first network device may encapsulate the IPV6 basic header and the IPV6 extension header in the first packet.

Figure 4A:
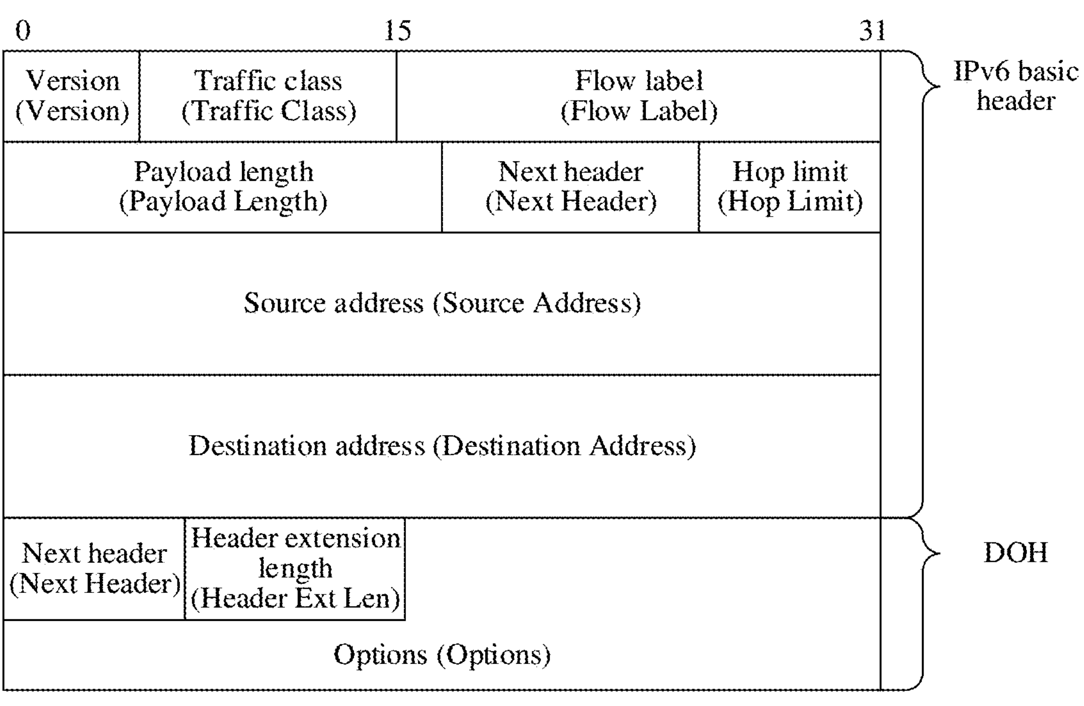
FIG. 4*a* is a schematic diagram of a format of a DOH according to an embodiment of this application.

When the IPV6 header is the IPV6 extension header, the IPV6 extension header may be used to carry the VNI. The IPV6 extension header may include a hop-by-hop option header (HBH), a destination option header (DOH), a routing header (RH), a segment routing header (SRH), or the like. A format of the DOH is shown in FIG. 4*a*. The DOH includes a next header field, a header extension length (Hdr Ext Len) field, and an options field.

Figure 4B:
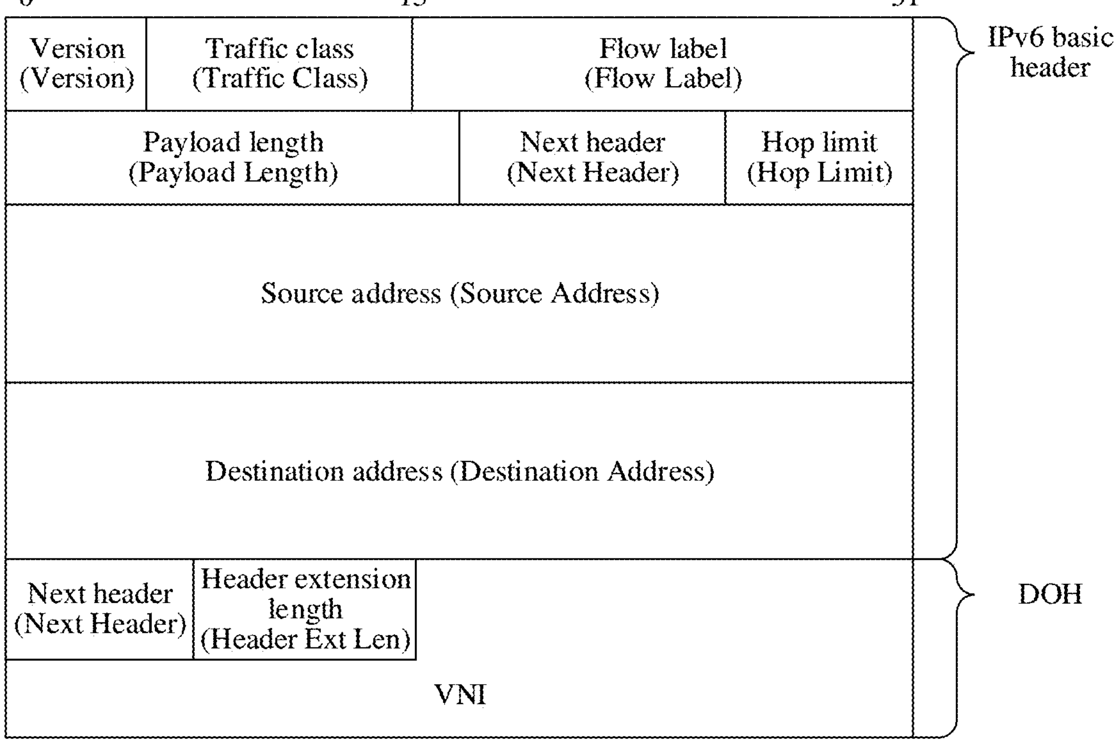
FIG. 4*b* is a schematic diagram of encapsulating a VNI in a DOH according to an embodiment of this application.
Figure 4C:
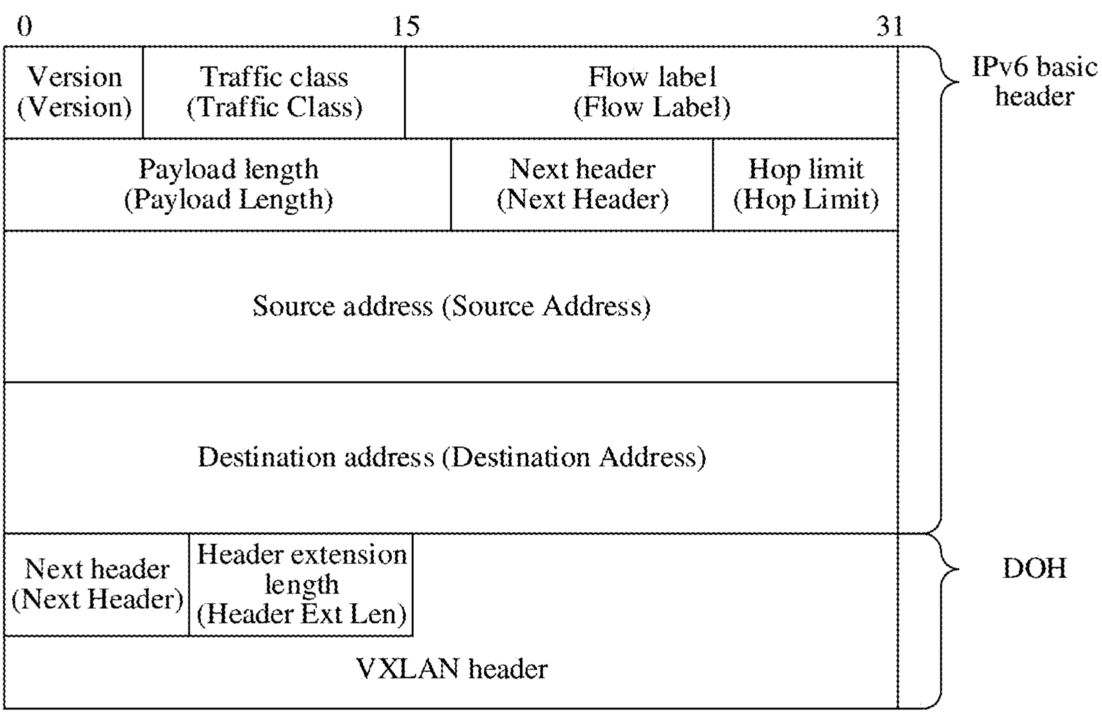
FIG. 4*c* is another schematic diagram of encapsulating a VNI in a DOH according to an embodiment of this application.
Figure 4D:
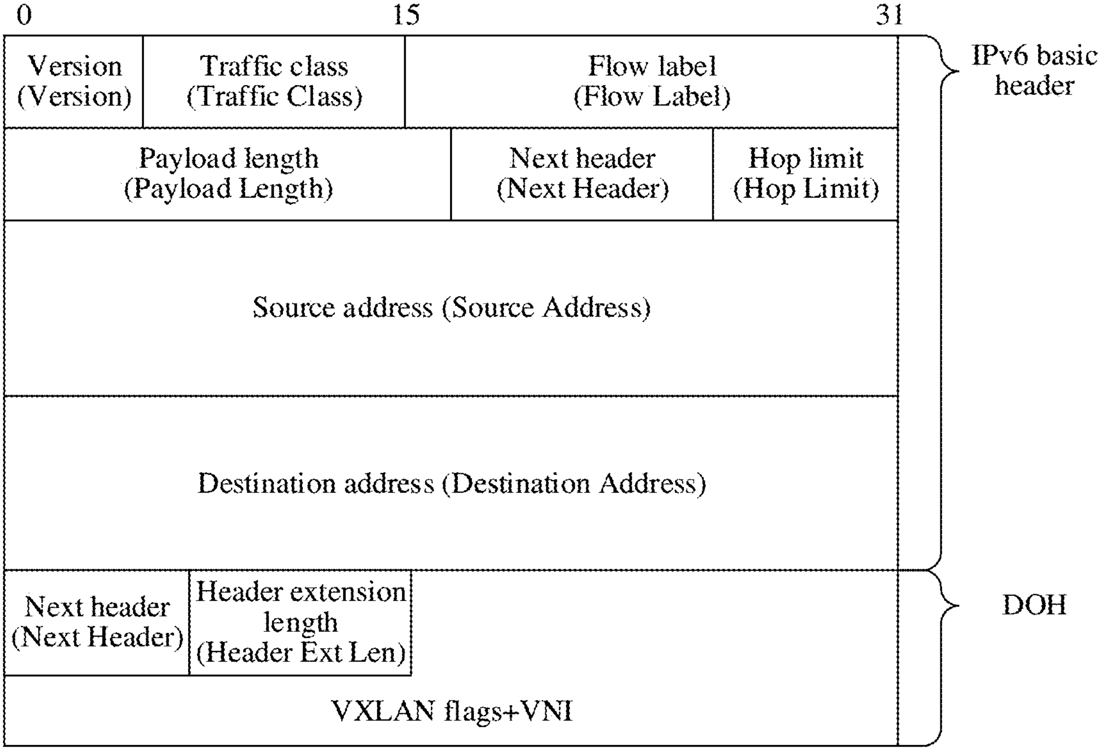
FIG. 4*d* is still another schematic diagram of encapsulating a VNI in a DOH according to an embodiment of this application.

In an implementation, the VNI is carried in the DOH of the IPV6 extension header. When the DOH is used to carry the VNI, the options field in the DOH may be used to directly carry the VNI, as shown in FIG. 4*b*. Alternatively, the options field in the DOH may be used to carry the VXLAN header, and the VXLAN header carries the VNI, as shown in FIG. 4*c*. When the IPv6 extension header further includes the VXLAN flags, the options field in the DOH may be used to directly carry the VNI and the VXLAN flags, as shown in FIG. 4*d*. Alternatively, the options field in the DOH may be used to carry the VXLAN header, and the VXLAN header carries the VNI and the VXLAN flags. Specifically, the VXLAN header may be completely copied to the options field.

Optionally, "Options" in the DOH includes a type-length-value (type-length-value, TLV), and a type field in the TLV indicates that the DOH carries the VNI. For example, it may be specified that when the type field Tis 1, it indicates that the DOH carries the VNI. After receiving the second packet, another network device may determine, based on T=1, that the second packet includes the VNI.

Figure 5A:
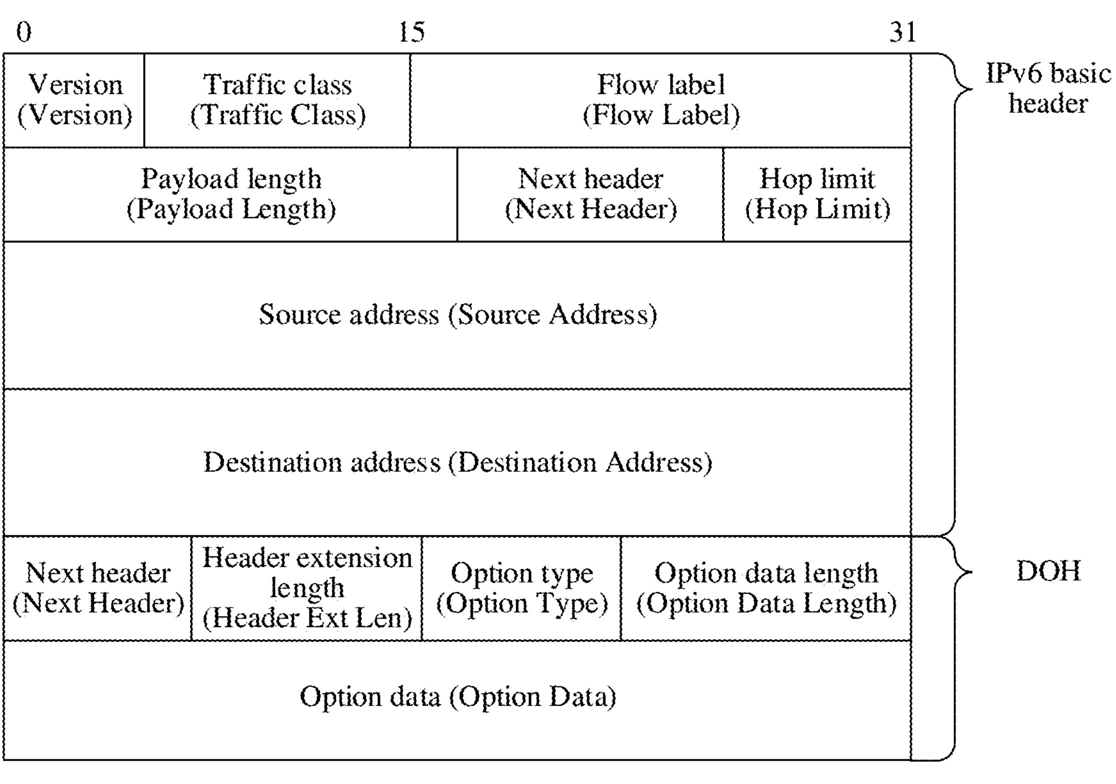
FIG. 5*a* is a schematic diagram of a format of a TLV according to an embodiment of this application.

Optionally, "Options" in the DOH includes a TLV, and a type of the TLV indicates that the DOH carries the VXLAN header. The TLV may be an enhanced VXLAN TLV, and the VXLAN TLV may also be referred to as a VN option TLV. As shown in FIG. 5*a*, the VN (VXLAN) option TLV includes an option type field, an option data length field, and an option data field.

Optionally, the option type field and the option data length field each occupy 8 bits, and the option data field occupies 64 bits.

The option type field identifies that the TLV is a VN option, and specifically identifies that the VN option carries the VNI, or identifies that the VN option carries the VXLAN header.

Figure 5B:
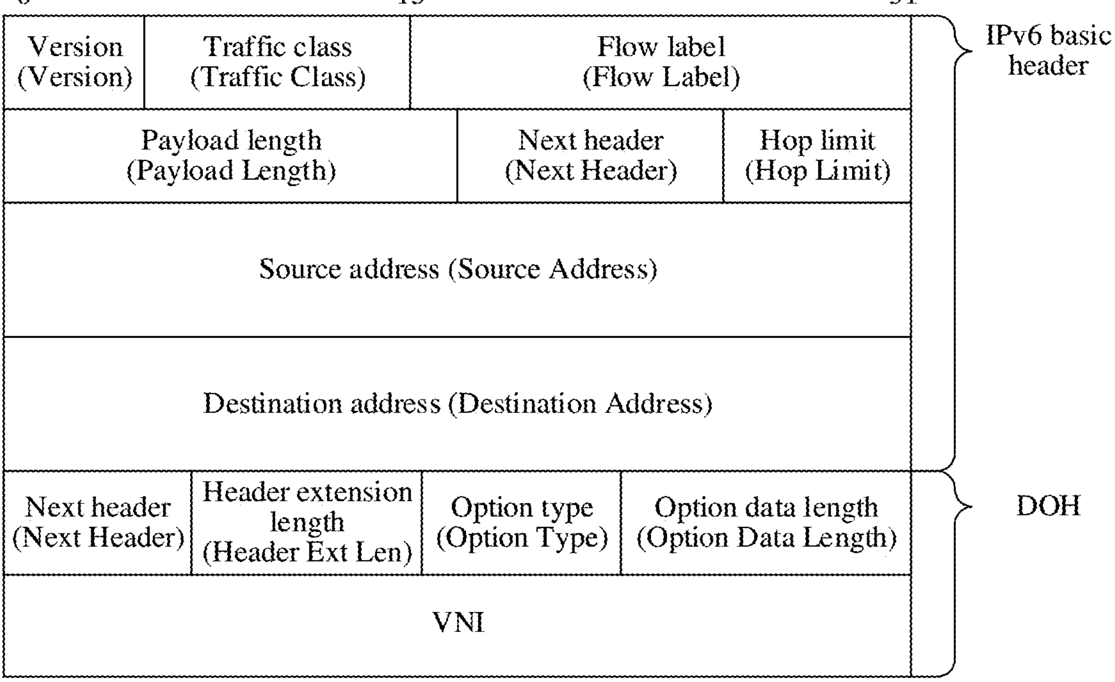
FIG. 5*b* is a schematic diagram of encapsulating a VNI by using a TLV according to an embodiment of this application.

Optionally, the VNI may be carried in the option data field, as shown in FIG. 5*b*.

Figure 5C:
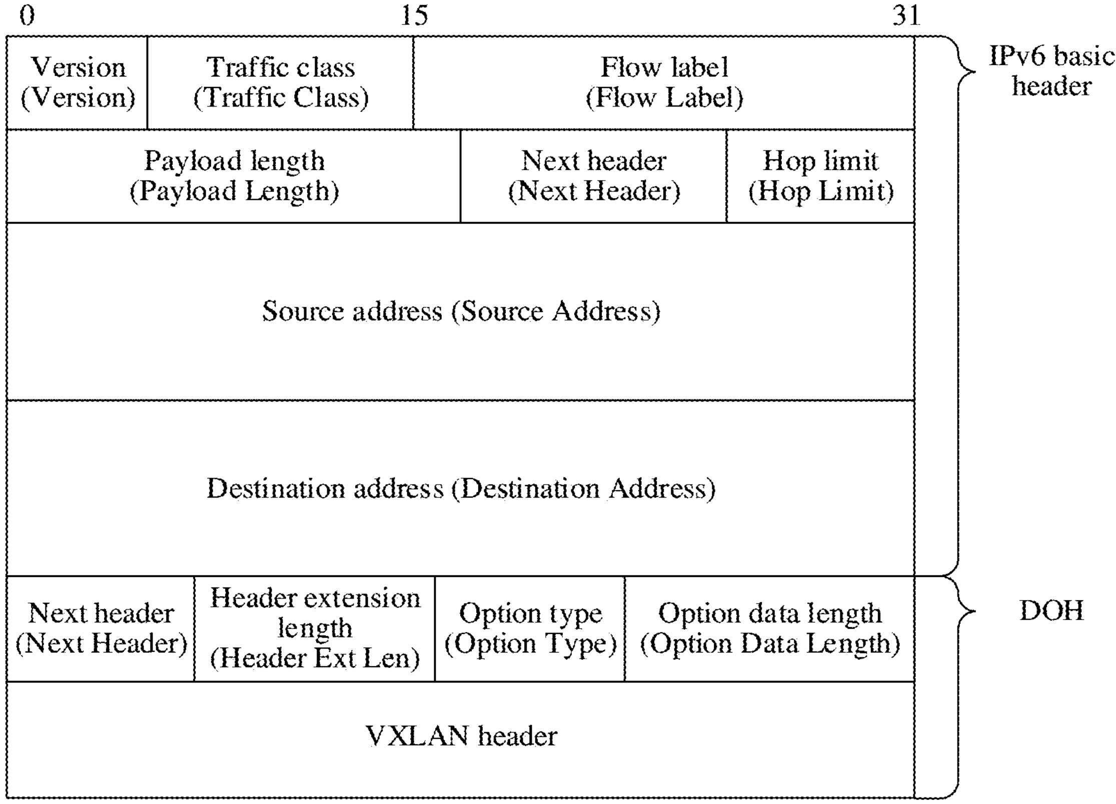
FIG. 5*c* is another schematic diagram of encapsulating a VNI by using a TLV according to an embodiment of this application.

Optionally, the VXLAN header may be carried in the option data field, as shown in FIG. 5*c*.

In some application scenarios, the packet may be forwarded based on a part or all of a pre-specified path. A segment routing (SR) protocol is a source routing protocol. A source node specifies a path for an application packet, converts the path into an ordered segment list, and encapsulates the list in a header. When SR is deployed on an IPV6 data plane, the SR is referred to as SRv6. During SRv6 application, forwarding path information is carried in an SRH that includes a SID list. The SID list includes a plurality of segment lists arranged in sequence, respectively indicating a plurality of segments. Each segment is instructions or an instruction set for packet processing. The SRH is encapsulated in the packet, and a segment identifier list in the SRH carries a process of processing the packet by an SR network. For example, in the application scenario shown in FIG. 1*a*, the specified path includes the switch 1 and the switch 2. In this case, a SID corresponding to the switch 1 and a SID corresponding to the switch 2 are added to the SID list carried in the SRH.

Figure 6A:
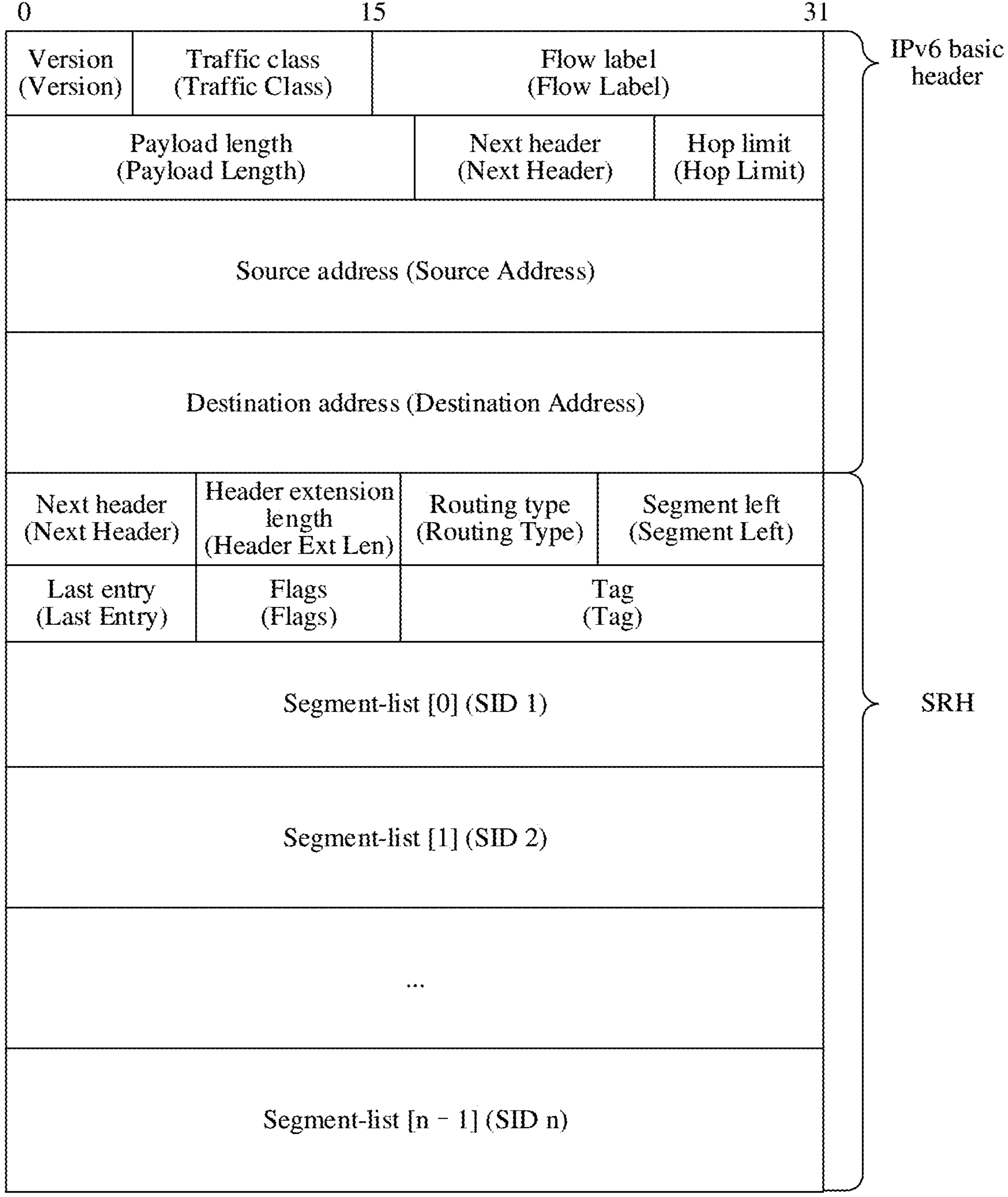
FIG. 6*a* is a schematic diagram of a format of an SRH according to an embodiment of this application.

In another implementation, when the VNI is carried in the SRH, the VNI may be carried in a SID list of the SRH. A format of the SRH is shown in FIG. 6*a*. The SRH includes a next header field, a header extension length field, a routing type field, a segment lef field, a last entry field, a flags field, a tag field, and the SID list. The SID list includes a plurality of elements arranged in sequence: a segment list [0] to a segment list [n−1]. Each element is a SID, and a length of each element is 128 bits. In FIG. 6*a*, the segment list [0] corresponds to a segment that is executed first, and the segment list [n−1] corresponds to a segment that is executed last.

Figures 6B, 6C:
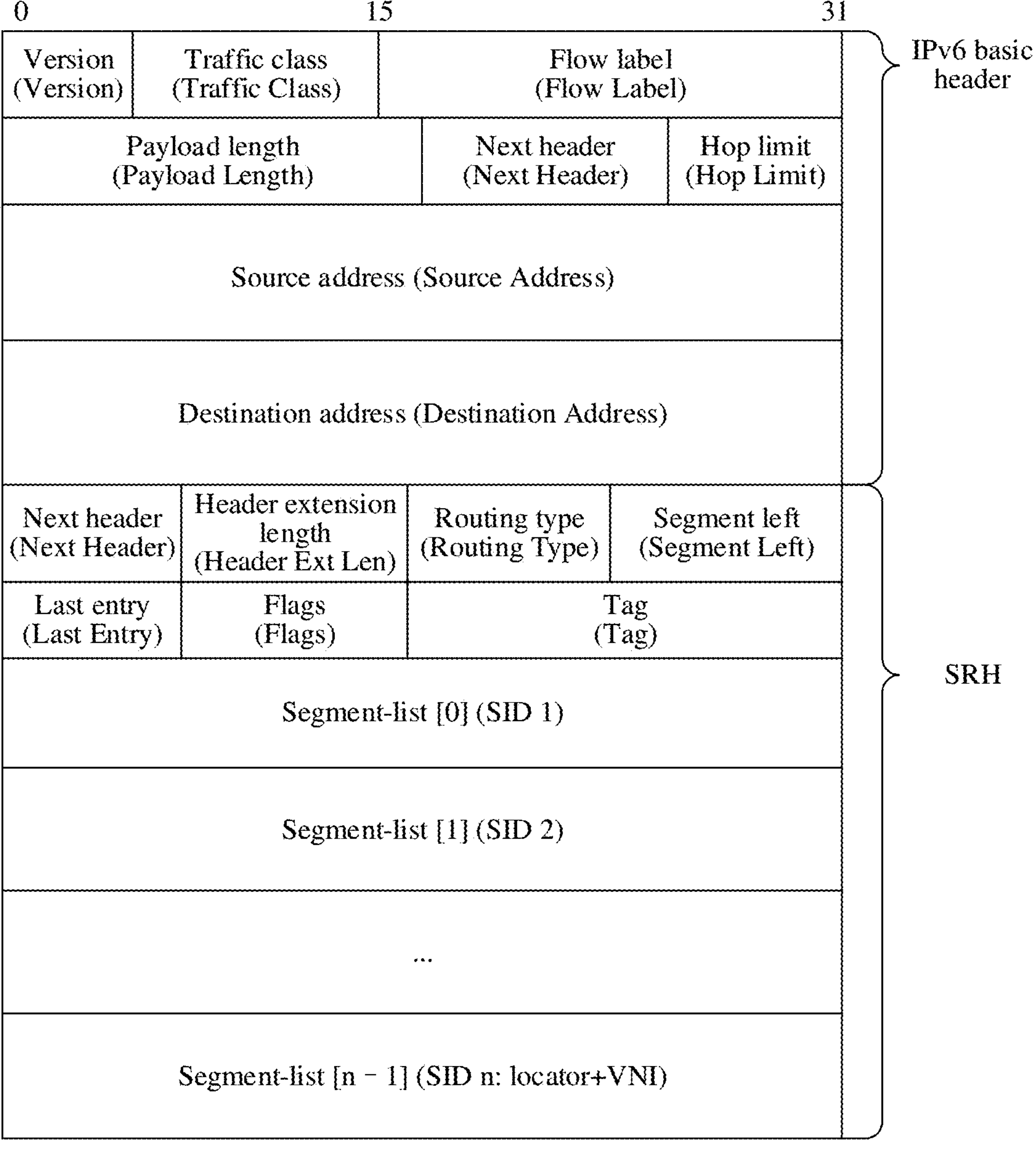
FIG. 6*b* is a schematic diagram of a format of a SID according to an embodiment of this application.
FIG. 6*c* is a schematic diagram of encapsulating a VNI in an SRH according to an embodiment of this application.

A format of the SID is shown in FIG. 6*b*. The SID may include a locator field and a function field. The SID may further include a parameter field and/or a padding field after the function field. Content of the locator field may also be referred to as a locator for short, is an identifier allocated to a network node in a network topology, and identifies the network node in the network topology. Content of the function field may also be referred to as a function for short, indicates instructions or an instruction set for packet processing, and is equivalent to operation codes of computer instructions. When the instructions or the instruction set indicated by the function is executed on the network node, the network node is enabled to perform a corresponding forwarding behavior. Content of the argument field may also be referred to as an argument for short, and indicates a parameter used in execution of the instructions or the instruction set indicated by the function.

A case in which the VNI is carried in the SID list may include the following cases.

Case 1:

The VNI is carried in a SID corresponding to the second network device in the SID list. Optionally, the VNI is carried in a function field of the SID of the second network device. When the SID of the second network device is used to carry the VNI, the SID of the second network device may be used to directly carry the VNI. As shown in FIG. 6*c*, the SID list includes a SID 1 to a SID n, and the SID of the second network device is the SID n. The SID n includes a locator and the VNI. The locator is an address or a prefix of the second network device. For example, the VNI may occupy the $64^{th}$ bit to the $128^{th}$ bit in the SID of the second network device, or occupy the $80^{th}$ bit to the $128^{th}$ bit in the SID of the second network device. When the SID n further includes a parameter, the SID n includes the locator, the VNI, and the argument. In this case, the VNI may occupy the $64^{th}$ bit to the $87^{th}$ bit in the SID of the second network device.

Figure 6D:
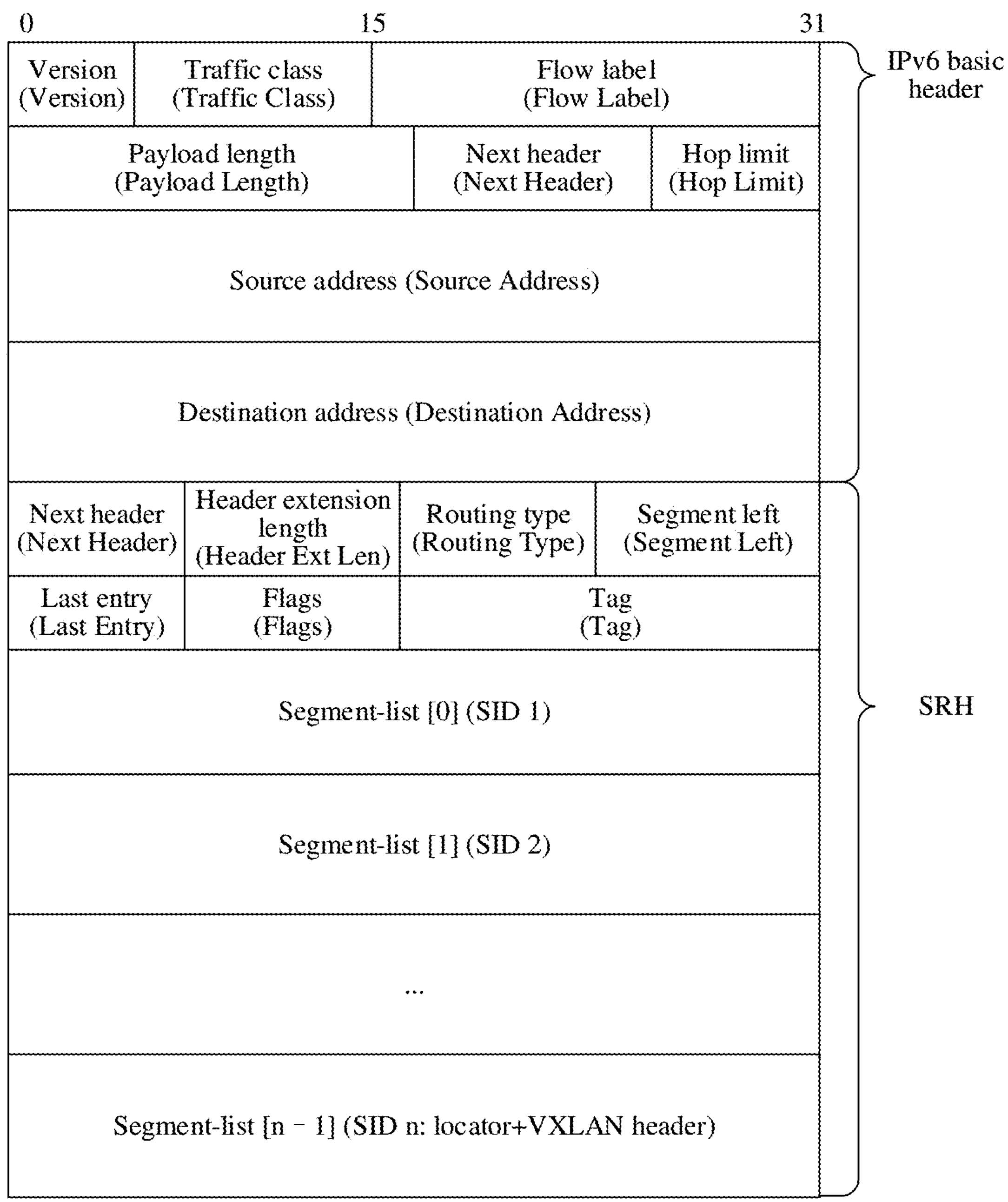
FIG. 6*d* is another schematic diagram of encapsulating a VNI in an SRH according to an embodiment of this application.

Alternatively, the SID of the second network device is used to carry the VXLAN header, and the VXLAN header includes the VNI. As shown in FIG. 6*d*, the SID of the second network device is the SID n, and the SID n includes the locator and the VXLAN header. Specifically, the VXLAN header may occupy the $64^{th}$ bit to the $128^{th}$ bit in the SID of the second network device. The SID of the second network device indicates the second network device to forward the packet based on the VNI carried in the SID.

Case 2:

The VNI is carried in a SID of a network device other than the second network device. For example, if the SID of the second network device in the SID list is a SID 3, the VNI is carried in a SID 4 in the SID list. That is, the VNI is carried in another SID. In this case, the another SID may be used to directly carry the VNI. For a carrying manner, refer to FIG. 6*c*. Alternatively, the another SID may be used to carry the VXLAN header, and the VXLAN header includes the VNI. For a carrying manner, refer to FIG. 6*d*. The SID of the second network device indicates the second network device to read the VNI from the another SID, and forward the packet based on the VNI.

In this embodiment, because the second network device needs to forward the packet based on the VNI, when advertising the SID of the second network device, the second network device may notify that a type of the SID of the second network device is END.VN. The SID is an SRv6 SID. A locator part of the SID includes a VTEP address corresponding to the VXLAN packet or an SRv6 locator of the VTEP, and a function part of the SID includes the VNI or the VXLAN header. Forwarding actions corresponding to a behavior related to the SID include: after the packet reaches a destination VTEP node, obtaining a corresponding VXLAN instance forwarding table based on the VNI in the SID, decapsulating the packet, searching the forwarding table based on a MAC address and the like in payload, and forwarding the packet. Optionally, a SID corresponding to an address of the second network device is a SID of END.VN type. Optionally, the SID corresponding to the address of the second network device is an SRv6 locator of the second network device.

During specific implementation, after establishing an interior gateway protocol (IGP) session or a border gateway protocol (BGP) session with the first network device, the second network device may advertise the SID of the second network device and a type corresponding to the SID to the first network device by using the IGP or the BGP. The first network device stores the SID of the second network device and the type corresponding to the SID. When needing to forward the VXLAN packet to the second network device, the first network device may encapsulate the VNI corresponding to the packet in the IPV6 header based on the type of the SID of the second network device. When advertising the SID, the second network device locally establishes a forwarding table, and the forwarding table includes a match item and an action item. The match item includes the SID of the second network device. The action item indicates the second network device to decapsulate the packet and forward the packet based on the VNI carried in the packet.

Figure 6E:
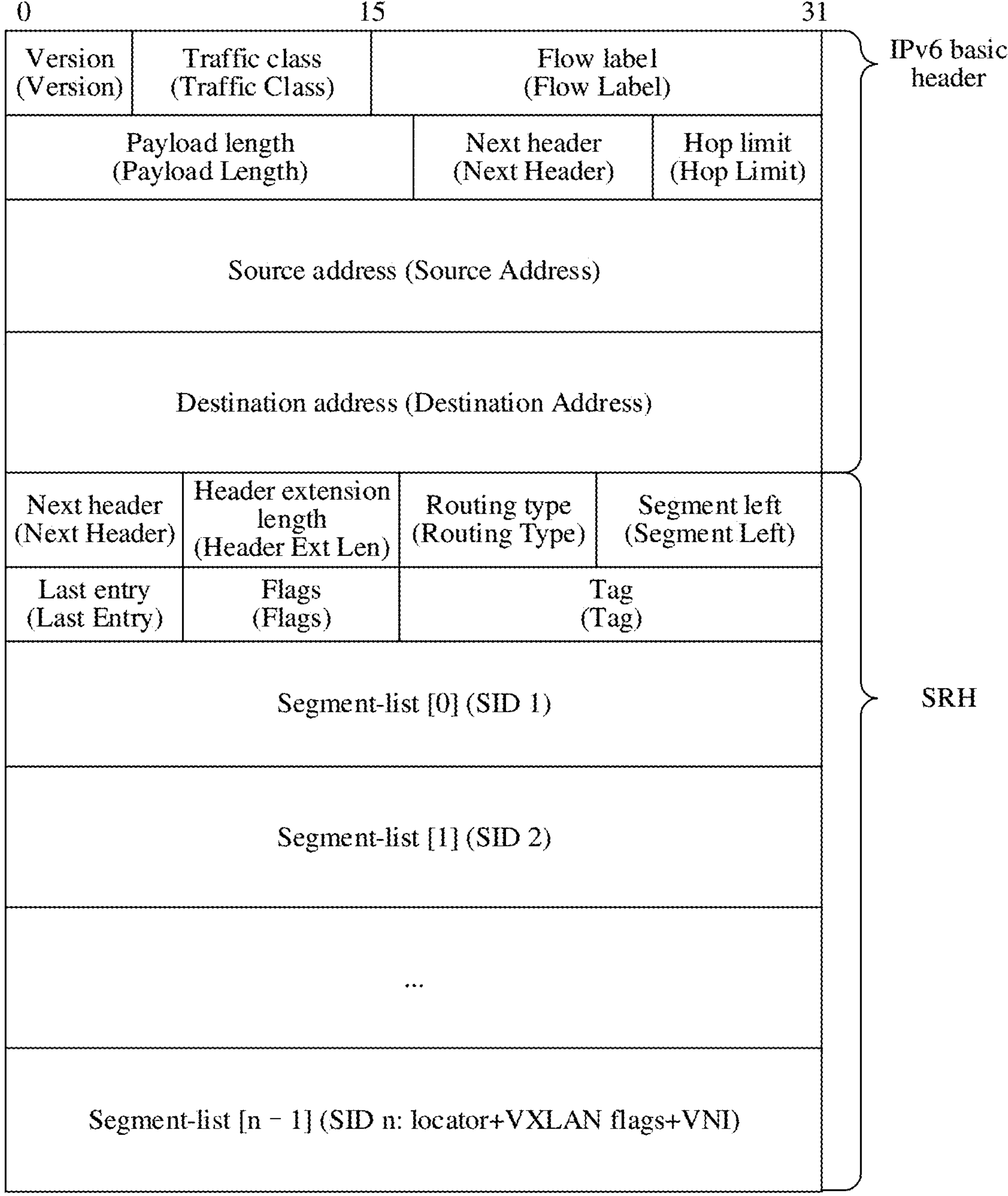
FIG. 6*e* is still another schematic diagram of encapsulating a VNI in an SRH according to an embodiment of this application.

When the IPV6 header further includes the VXLAN flags, the VXLAN flags may be carried in the SID of the second network device. For example, the VXLAN flags and the VNI are encapsulated in the SID n in FIG. 6*e*. When the SID n further includes the parameter (argument), the SID n includes the locator, the VXLAN flags, the VNI, and the argument.

It may be learned from the foregoing descriptions that the IPV6 basic header may be used to carry the VNI, or the IPV6 extension header may be used to carry the VNI. In either manner, no additional UDP header needs to be encapsulated. This reduces an amount of data for packet encapsulation, and improves packet encapsulation efficiency.

In addition, a flow label in the IPV6 header may correspond to a destination port number of the VXLAN packet. The destination port number may be used to not only perform load balance processing in a forwarding process of the second packet, but also determine that the second packet includes the VXLAN packet. For example, when the port number carried in the flow label is 4789, it may be identified, based on the port number, that a received packet includes the VXLAN packet. The port number may be a preset fixed port number, or may be a port number obtained through dynamic calculation based on a payload of the first packet. Optionally, a method for calculating the flow label of the second packet is the same as a method for calculating a UDP source port used for load balance in the VXLAN packet, and a port number value obtained from the VXLAN packet may be carried in the flow label of the second packet.

To implement an in-situ flow information telemetry (in-situ flow information telemetry, IFIT) function, when the IPV6 header is encapsulated in the first packet, IFIT instructions may be carried in the IPV6 header, to implement hop-by-hop network in-situ flow information telemetry, or network in-situ flow information telemetry of a specified node or a destination node. Specifically, the IFIT instructions may be carried in the IPV6 extension header.

S204: The first network device sends the second packet to the second network device.

In this embodiment, after obtaining the second packet by encapsulating the IPV6 header in the first packet, the first network device sends the second packet to the second network device. The second network device may be an end node in a VXLAN network. For example, the second network device is the switch 2 in FIG. 1*a*. Optionally, the destination address field in the IPV6 header of the second packet includes the address of the second network device or the SRv6 locator of the second network device. For example, in FIG. 1*a*, the destination address field in the IPV6 header of the second packet includes an address of the switch 2 or an SRv6 locator of the switch 2.

S205: The second network device receives the second packet, and obtains the VNI from the IPV6 header of the second packet.

It may be learned from the foregoing descriptions that the VNI may be carried in the IPV6 basic header or the IPV6 extension header. In cases in which the VNI is carried in different IPv6 headers, the second network device obtains the VNI from the IPV6 header in different manners.

When the VNI is carried in the destination address field of the IPV6 basic header, after receiving the second packet sent by the first network device, the second network device determines whether the destination address field includes the address of the second network device. If the destination address field includes the address of the second network device, the VNI is obtained from the destination address field. When the VNI is directly carried in the destination address field, the second network device may obtain the VNI by parsing the destination address field. When the VNI is carried in the VXLAN header and the VXLAN header is carried in the destination address field, the second network device needs to first parse the destination address field to obtain the VXLAN header, and read the VNI from the VXLAN header.

It should be noted that, because the address of the second network device needs to be encapsulated in the second packet, before the second network device receives the second packet sent by the first network device, the second network device needs to advertise the address of the second network device to the first network device. The address of the second network device indicates the second network device to forward the packet based on the VNI carried in the destination address field when receiving the second packet. When advertising the address of the second network device to the first network device, the second network device locally establishes a forwarding entry, and the forwarding entry may include a match item and an action item. The match item includes the address of the second network device. The action item indicates that after matching succeeds by using the match item, the VNI is obtained from the destination address field, the second packet is decapsulated, and the decapsulated packet is forwarded based on the VNI.

When the VNI is carried in the DOH of the IPV6 extension header, after receiving the second packet sent by the first network device, the second network device determines whether the destination address field includes the address of the second network device. If the destination address field includes the address of the second network device, it is determined whether the type field of the TLV in the DOH indicates that the VNI is carried. If the type field of the TLV indicates that the VNI is carried, the VNI is obtained from the DOH. When the VNI is directly carried in the DOH, the second network device may obtain the VNI by parsing the DOH. When the VNI is carried in the VXLAN header and the VXLAN header is carried in the DOH, the second network device needs to first parse the DOH to obtain the VXLAN header, and read the VNI from the VXLAN header.

When the VNI is carried in the SID corresponding to the second network device in the SID list of the SRH in the IPV6 extension header, after receiving the second packet, the second network device determines whether the destination address field of the second packet includes the SID of the second network device. If the destination address field of the second packet includes the SID of the second network device, the second network device obtains the VNI from the SID of the second network device carried in the second packet.

When the VNI is carried in another corresponding SID (a SID of a network device other than the second network device) in the SID list of the SRH in the IPV6 extension header, after receiving the second packet, the second network device determines whether the destination address field of the second packet includes the SID of the second network device. If the destination address field of the second packet includes the SID of the second network device, the second network device obtains the VNI from the another SID carried in the second packet. For example, a field or a new field in the SRH may be used to indicate the second network device to obtain the VNI from a specified SID, or it is predefined that the VNI is carried in a next SID adjacent to the SID of the second network device. In this case, after receiving the second packet, the second network device reads the next SID from the SID list, and obtains the VNI from the next SID.

It should be noted that, because the SID of the second network device needs to be encapsulated in the second packet, before the second network device receives the second packet sent by the first network device, the second network device needs to advertise the SID of the second network device to the first network device. In addition, a type of the SID of the second network device may be further advertised. The type corresponding to the SID of the second network device may be defined as END.VN, and indicates the second network device to obtain, after receiving the corresponding packet, the VNI from the packet, decapsulate the packet, search the forwarding table based on the VNI, and forward the decapsulated packet based on the forwarding table. The SID of the second network device may be the address of the second network device, or a corresponding address obtained by compressing the address of the second network device.

When advertising the SID of the second network device to the first network device, the second network device may further locally establish the forwarding entry. The forwarding entry includes the match item and the action item. The match item includes the SID of the second network device. The action item indicates an action that needs to be performed when the matching succeeds. For example, the action item indicates to decapsulate the second packet when the matching succeeds, and forward the decapsulated packet based on the VNI.

S206: The second network device decapsulates the second packet to obtain the first packet.

In this embodiment, after obtaining the VNI, when determining, based on information in the encapsulated IPV6 header, that the second network device is an end node, the second network device decapsulates the second packet, and removes the encapsulated IPv6 header, to obtain the first packet. For example, when the second network device determines that the destination address field in the IPV6 header of the second packet includes the SID of the second network device, the second network device decapsulates the second packet based on the action item in the forwarding entry to obtain the first packet. The decapsulating the packet includes: removing the IPV6 basic header encapsulated in the second packet to obtain the first packet, or removing the IPV6 basic header and the IPV6 extension header encapsulated in the second packet to obtain the first packet.

An execution sequence of S205 and S206 is not limited in this embodiment. S206 may be performed before S205, S205 may be performed before S206, or S205 and S206 may be performed simultaneously.

S207: The second network device forwards the first packet based on the VNI.

After obtaining the first packet, the second network device determines a forwarding path based on the VNI, and forwards the first packet based on the forwarding path. Specifically, the second network device obtains the corresponding VXLAN instance forwarding table based on the VNI, searches the VXLAN instance forwarding table for the forwarding entry based on the destination address in the first packet, and forwards the first packet based on the forwarding entry. It should be noted that, when the first packet is a layer 2 packet, the corresponding destination address is a MAC address, and the obtained forwarding table is a MAC table. When the first packet is a layer 3 packet, the corresponding destination address is an IP address, and the obtained forwarding table is a routing table.

Figure 6F:
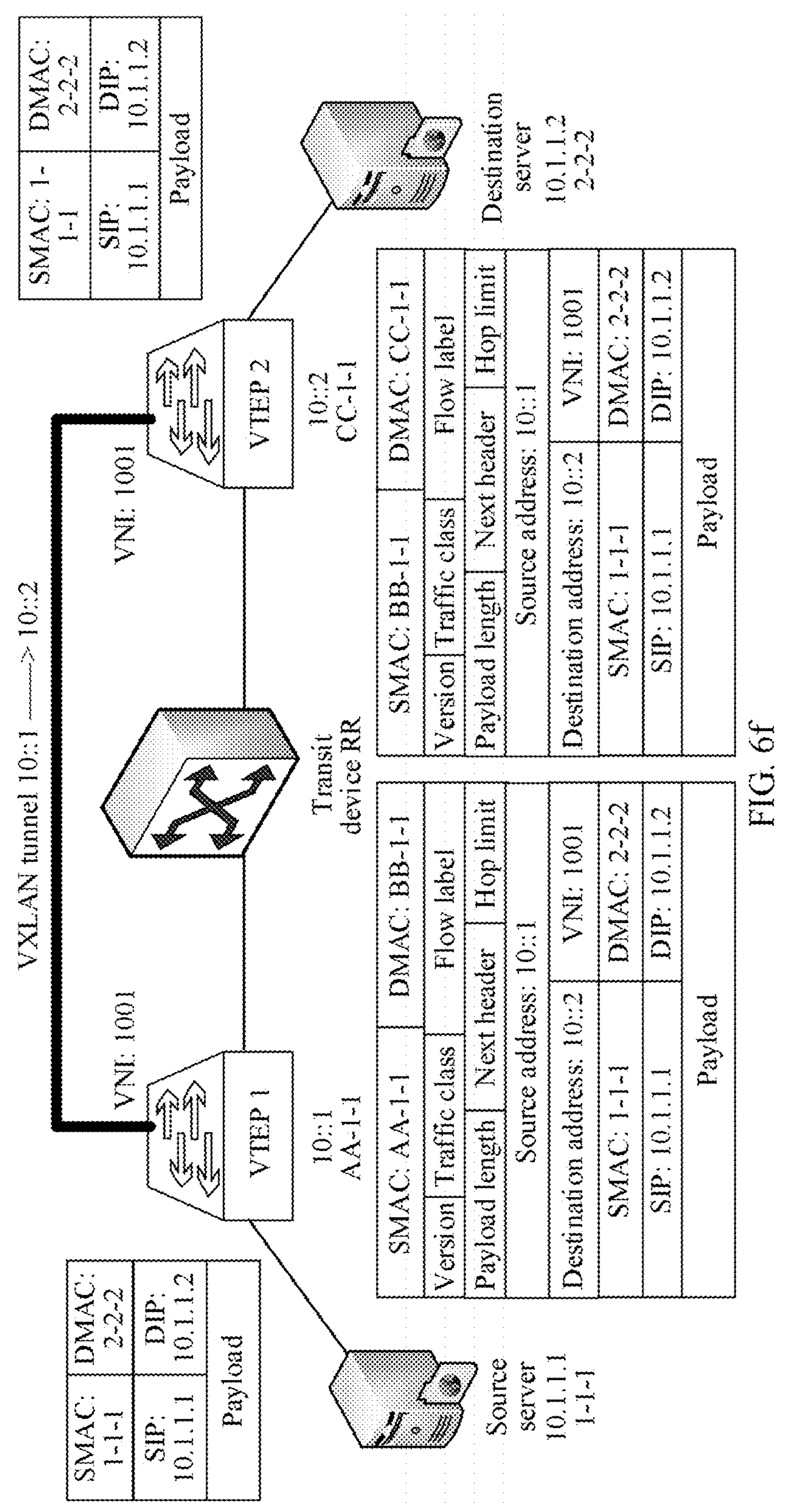
FIG. 6*f* is a schematic diagram of an application scenario according to an embodiment of this application.

For ease of understanding, refer to a schematic diagram of an application scenario shown in FIG. **6*f*. An example in which the application scenario includes a source server, a destination server, a VTEP 1, a VTEP 2, and a transit device RR is used for description. An IPV4 address of the source server is 10.1.1.1, and a MAC address is 1-1-1. An IPV4 address of the destination server is 10.1.1.2, and a MAC address is 2-2-2. An IPV6 address of the VTEP 1 is 10::1, and a MAC address is AA-1-1. An IP address of the VTEP 2 is 10::2, and a MAC address is CC-1-1. A MAC address of the transit device RR is BB-1-1. A VXLAN tunnel is established between the VTEP 1 and the VTEP 2. VNIs corresponding to the VTEP 1 and the VTEP 2 are 1001. In FIG. 6*f*, forwarding of a layer 2 service packet is used as an example for description. Specifically, after receiving a packet 1 sent by the source server, the VTEP 1 determines, based on information about a port connected between the VTEP 1 and the source server, a tenant identifier VNI 1001** corresponding to the source server, and encapsulates the VNI in a destination address field of an IPV6 basic header. The destination address field further includes an address 10::2 of the tunnel endpoint VTEP 2. A source address field includes an address 10::1 of the tunnel endpoint VTEP 1. In addition, an outer MAC header is encapsulated. The MAC header includes a source MAC address AA-1-1 and a destination MAC address BB-1-1. The VTEP 1 obtains a packet 2 after the encapsulation, and sends the packet 2 to the transit device RR. After receiving the packet 2, the transit device RR determines a MAC address of a next-hop network device based on a layer 2 forwarding table, updates the source MAC and the destination MAC in the outer MAC header: updates the source MAC to BB-1-1 and the destination MAC to CC-1-1, to obtain a packet 3, and forwards the packet 3 to the VTEP 2. The VTEP 2 finds, based on the destination address 10::2, that the VTEP 2 is the tunnel endpoint node. In this case, the VTEP 2 obtains the VNI: 1001 from the destination address field in the IPV6 basic header of the packet 3, searches the corresponding forwarding table based on the VNI, decapsulates the IPV6 basic header in the packet 3 to obtain a packet 4, and forwards the packet 4 to the destination server based on the forwarding table.

Based on the foregoing method embodiment, an embodiment of this application further provides a network device for VXLAN packet transmission. This is described below with reference to the accompanying drawings.

Figure 7:
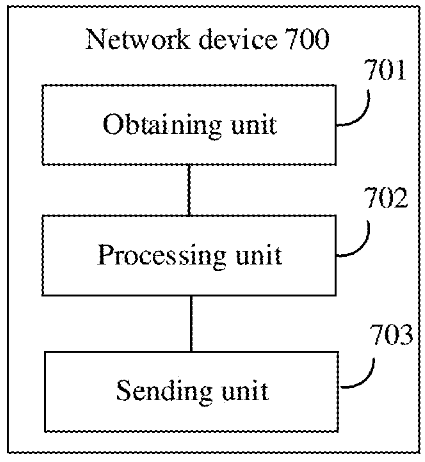
FIG. 7 is a schematic diagram of a structure of a network device for VXLAN packet transmission according to an embodiment of this application.

FIG. 7 is a schematic diagram of a possible structure of the network device in the foregoing method embodiment. The network device 700 may implement functions of the first network device in the embodiment shown in FIG. 2. Alternatively, the network device 700 may implement functions of the switch 1 in the embodiment shown in FIG. 1*a* and the VTEP 1 in the embodiment shown in FIG. 6. Refer to FIG. 7. The network device 700 includes an obtaining unit 701, a processing unit 702, and a sending unit 703. These units may perform corresponding functions of the first network device in the foregoing method example. The obtaining unit 701 is configured to support the network device 700 in performing S201 in FIG. 2. The processing unit 702 is configured to support the network device 700 in performing S202 and S203 in FIG. 2. The sending unit 703 is configured to support the network device 700 in performing S204 in FIG. 2, and/or performing another process performed by the first network device in the technology described in this specification. For example, the obtaining unit 701 is configured to perform an operation of obtaining a first packet by the first network device in the foregoing method embodiment. The processing unit 702 is configured to perform various processing operations performed by the first network device in the foregoing method embodiment. The sending unit 703 is configured to perform an operation of sending a packet by the first network device in the foregoing method embodiment. For example, the processing unit 702 is configured to: obtain a VNI based on the first packet, and encapsulate an IPV6 header in the first packet to obtain a second packet. The sending unit 703 is configured to send the second packet to a second network device. For a specific execution process, refer to detailed descriptions of corresponding steps in the embodiment shown in FIG. 2 or FIG. 6. Details are not described herein again.

Optionally, the processing unit 702 is specifically configured to obtain the VNI based on an interface for receiving the first packet. The VNI corresponds to the interface for receiving the first packet.

It should be noted that, in this embodiment of this application, unit division is an example, and is merely logical function division. During actual implementation, another division manner may be used. Functional units in this embodiment of this application may be integrated into one processing unit, or each of the units may exist alone physically, or two or more units are integrated into one unit. For example, in the foregoing embodiment, the processing unit and the sending unit may be a same unit, or may be different units. The integrated unit may be implemented in a form of hardware, or may be implemented in a form of a software functional unit.

Figure 8:
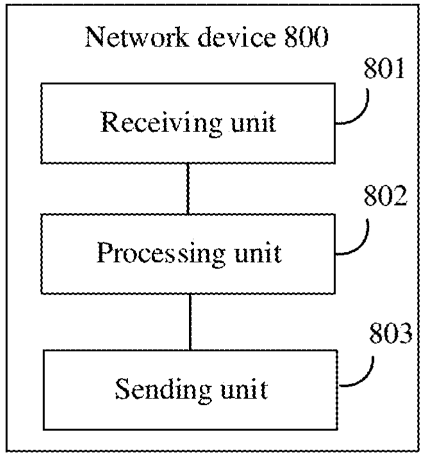
FIG. 8 is a schematic diagram of a structure of another network device for VXLAN packet transmission according to an embodiment of this application.

FIG. 8 is a schematic diagram of a possible structure of the network device in the foregoing method embodiment. The network device 800 may implement functions of the second network device in the embodiment shown in FIG. 2. Alternatively, the network device 800 may implement functions of the switch 2 in the embodiment shown in FIG. 1*a* and the VTEP 2 in the embodiment shown in FIG. 6. Refer to FIG. 8. The network device 800 includes a receiving unit 801, a processing unit 802, and a sending unit 803. These units may perform corresponding functions of the second network device in the foregoing method example. The receiving unit 801 is configured to support the network device 800 in performing S205 in FIG. 2. The processing unit 802 is configured to support the network device 800 in performing S205 and S206 in FIG. 2. The sending unit 803 is configured to support the network device 800 in performing S207 in FIG. 2, and/or performing another process performed by the second network device in the technology described in this specification. For example, the receiving unit 801 is configured to perform an operation of receiving a second packet by the second network device in the foregoing method embodiment. The processing unit 802 is configured to perform various processing operations performed by the second network device in the foregoing method embodiment. The sending unit 803 is configured to perform an operation of forwarding the first packet by the second network device in the foregoing method embodiment. For example, the processing unit 802 is configured to: obtain a VNI from an IPv6 header of the second packet, and decapsulate the second packet to obtain a first packet. The sending unit 803 is configured to forward the first packet. For a specific execution process, refer to detailed descriptions of corresponding steps in the embodiment shown in FIG. 2 or FIG. 6. Details are not described herein again.

Optionally, the processing unit 802 is specifically configured to: determine that a destination address field includes an address of the second network device, and obtain the VNI from the destination address field in response to determining that the destination address field includes the address of the second network device.

Optionally, the processing unit 802 is specifically configured to: determine that the destination address field of the second packet includes a SID of the second network device, and obtain the VNI from the SID of the second network device in response to determining that the destination address field of the second packet includes the SID of the second network device.

Optionally, the sending unit 803 is further configured to: before the receiving unit 801 receives the second packet from a first network device, advertise the SID of the second network device to the first network device.

Optionally, the processing unit 802 is further configured to: establish a forwarding entry, where the forwarding entry includes a match item and an action item, and the match item includes the SID of the second network device; decapsulate the second packet based on the action item; and forward the first packet based on the VNI.

It should be noted that, in this embodiment of this application, unit division is an example, and is merely logical function division. During actual implementation, another division manner may be used. Functional units in this embodiment of this application may be integrated into one processing unit, or each of the units may exist alone physically, or two or more units are integrated into one unit. For example, in the foregoing embodiment, the processing unit and the sending unit may be a same unit, or may be different units. The integrated unit may be implemented in a form of hardware, or may be implemented in a form of a software functional unit.

Figure 9:
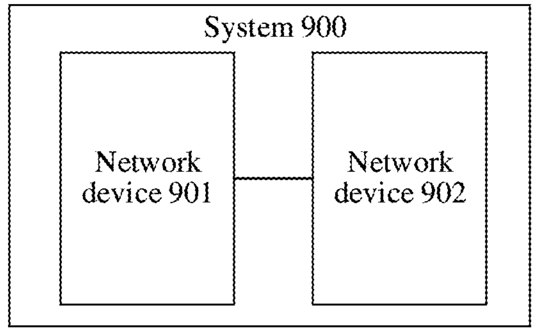
FIG. 9 is a schematic diagram of a structure of a network system for VXLAN packet transmission according to an embodiment of this application.

Refer to FIG. 9. An embodiment of this application provides a network system 900 for VXLAN packet transmission. The system 900 is configured to implement the VXLAN packet transmission method in the foregoing method embodiment. The system 900 includes a network device 901 and a network device 902. The network device 901 may implement functions of the first network device in the embodiment shown in FIG. 2 or functions of the network device 700 in FIG. 7. The network device 902 may implement functions of the second network device in the embodiment shown in FIG. 2 or functions of the network device 800 in FIG. 8. The network device 901 may further implement functions of the switch 1 in the embodiment shown in FIG. 1*a* or functions of the VTEP 1 in the embodiment shown in FIG. 6. The network device 902 may further implement functions of the switch 2 in the embodiment shown in FIG. 1*a* or functions of the VTEP 2 in the embodiment shown in FIG. 6. For a specific execution process, refer to detailed descriptions of corresponding steps in the embodiment shown in FIG. 2 or FIG. 6. Details are not described herein again.

Figure 10:
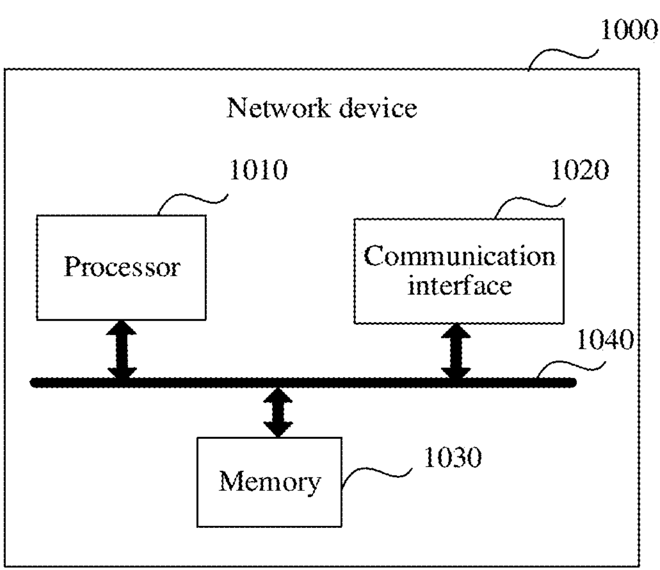
FIG. 10 is a schematic diagram of a structure of a network device according to an embodiment of this application.

FIG. 10 is a schematic diagram of a structure of a network device according to an embodiment of this application. The network device may be, for example, the first network device or the second network device in the foregoing method embodiment. Alternatively, the network device 700 in FIG. 7 and the network device 800 in FIG. 8 may be implemented by using the device shown in FIG. 10.

Refer to FIG. 10. The network device 1000 includes a processor 1010, a communication interface 1020, and a memory 1030. There may be one or more processors 1010 in the network device 1000. One processor is used as an example in FIG. 10. In this embodiment of this application, the processor 1010, the communication interface 1020, and the memory 1030 may be connected by using a bus system or in another manner. In FIG. 10, for example, a bus system 1040 is used for connection.

The processor 1010 may be a central processing unit (CPU), a network processor (NP), or a combination of the CPU and the NP. The processor 1010 may further include a hardware chip. The hardware chip may be an application-specific integrated circuit (ASIC), a programmable logic device (PLD), or a combination thereof. The PLD may be a complex programmable logic device (CPLD), a field-programmable logic gate array (FPGA), generic array logic (GAL), or any combination thereof.

When the network device is a first network device, the processor 1010 may perform related functions in the foregoing method embodiment, for example, receiving a first packet, obtaining a VNI corresponding to the first packet, and encapsulating an IPV6 header in the first packet to obtain a second packet.

The communication interface 1020 is configured to receive and send a packet. Specifically, the communication interface 1020 may include a receiving interface and a sending interface. The receiving interface may be configured to receive the packet, and the sending interface may be configured to send the packet. There may be one or more communication interfaces 1020.

The memory 1030 may include a volatile memory, for example, a random access memory (RAM). The memory 1030 may further include a non-volatile memory, for example, a flash memory, a hard disk drive (HDD), or a solid-state drive (SSD). The memory 1030 may further include a combination of the foregoing types of memories. The memory 1030 may store, for example, user-associated information described above.

Optionally, the memory 1030 stores an operating system, a program, an executable module or a data structure, a subset thereof, or an extended set thereof. The program may include various operation instructions for implementing various operations. The operating system may include various system programs, and is configured to implement various basic services and process a hardware-based task. The processor 1010 may read the program in the memory 1030, to implement the method provided in embodiments of this application.

The memory 1030 may be a storage device in the network device 1000, or may be a storage apparatus independent of the network device 1000.

The bus system 1040 may be a peripheral component interconnect (PCI) bus, an extended industry standard architecture (EISA) bus, or the like. The bus system 1040 may be classified into an address bus, a data bus, a control bus, and the like. For ease of representation, only one bold line is used to represent the bus in FIG. 10, but this does not mean that there is only one bus or only one type of bus.

Figure 11:
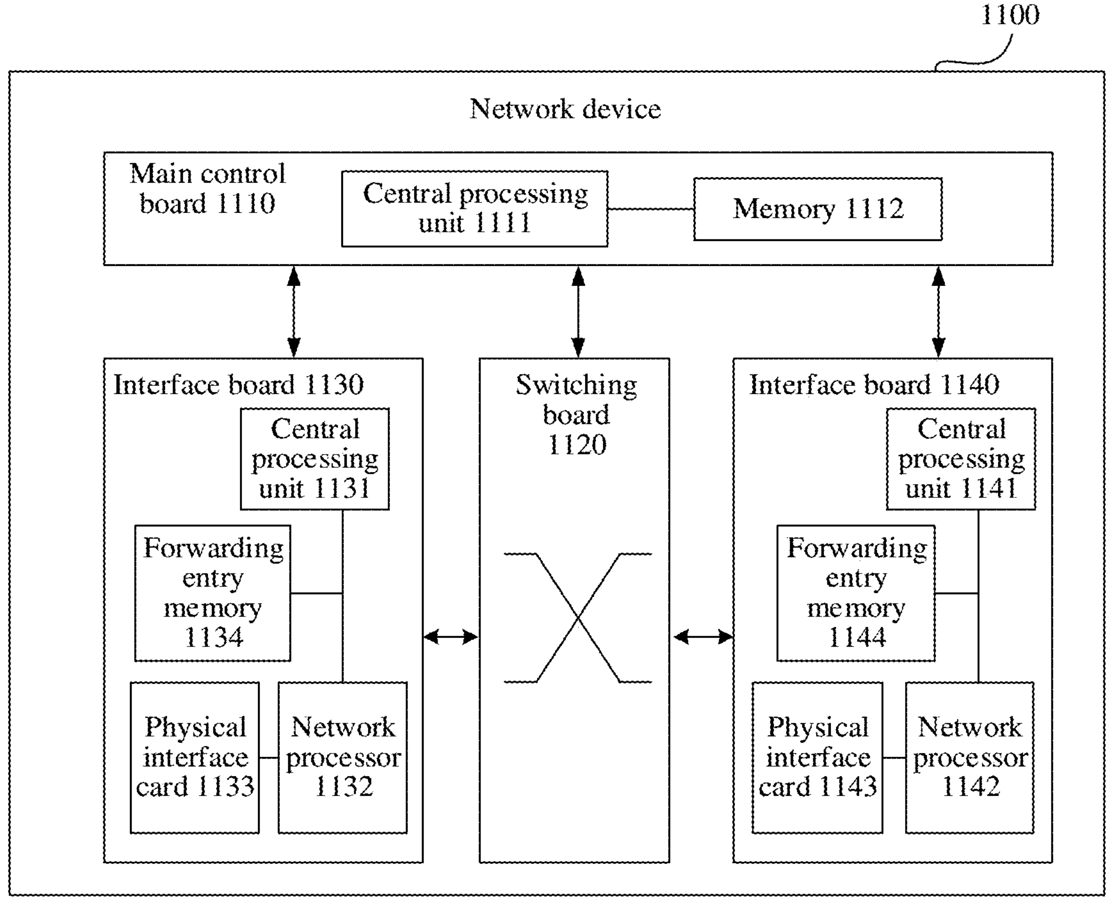
FIG. 11 is a schematic diagram of a structure of another network device according to an embodiment of this application.

FIG. 11 is a schematic diagram of a structure of another network device 1100 according to an embodiment of this application. The network device 1100 may be configured as the first network device or the second network device in the foregoing method embodiment. Alternatively, the network device 700 in FIG. 7 and the network device 800 in FIG. 8 may be implemented by using the device shown in FIG. 11.

The network device 1100 includes a main control board 1110 and an interface board 1130.

The main control board 1110 is also referred to as a main processing unit (MPU) or a route processor card. The main control board 1110 controls and manages components in the network device 1100, including functions of routing calculation, device management, device maintenance, and protocol processing. The main control board 1110 includes a central processing unit 1111 and a memory 1112.

The interface board 1130 is also referred to as a line processing unit (line processing unit, LPU), a line card (line card), or a service board. The interface board 1130 is configured to: provide various service interfaces, and forward a data packet. The service interface includes but is not limited to an Ethernet interface, a POS (Packet over SONET/SDH) interface, and the like. The Ethernet interface is, for example, a flexible Ethernet client interface (FlexE Clients). The interface board 1130 includes a central processing unit 1131, a network processor 1132, a forwarding entry memory 1134, and a physical interface card (physical interface card, PIC) 1133.

The central processing unit 1131 on the interface board 1130 is configured to: control and manage the interface board 1130, and communicate with the central processing unit 1111 on the main control board 1110.

The network processor 1132 is configured to implement packet forwarding processing. A form of the network processor 1132 may be a forwarding chip. Specifically, processing of an uplink packet includes: processing of an inbound interface of the packet, and searching a forwarding table. Processing of a downlink packet includes searching the forwarding table and the like.

The physical interface card 1133 is configured to implement a physical layer interconnection function. Original traffic enters the interface board 1130 through the physical interface card 1133, and a processed packet is sent out through the physical interface card 1133. The physical interface card 1133 includes at least one physical interface, and the physical interface is also referred to as a physical port. The physical interface card 1133 is also referred to as a subcard, may be mounted on the interface board 1130, and is responsible for converting an optical/electrical signal into a packet, performing validity check on the packet, and forwarding the packet to the network processor 1132 for processing. In some embodiments, the central processing unit 1131 of the interface board 1103 may also execute a function of the network processor 1132, for example, implementing software forwarding based on a general-purpose CPU. Therefore, the network processor 1132 is not required in the physical interface card 1133.

Optionally, the network device 1100 includes a plurality of interface boards. For example, the network device 1100 further includes an interface board 1140. The interface board 1140 includes a central processing unit 1141, a network processor 1142, a forwarding entry memory 1144, and a physical interface card 1143.

Optionally, the network device 1100 further includes a switching board 1120. The switching board 1120 may also be referred to as a switch fabric unit (SFU). When the network device has a plurality of interface boards 1130, the switching board 1120 is configured to complete data exchange between the interface boards. For example, the interface board 1130 may communicate with the interface board 1140 via the switching board 1120.

The main control board 1110 is coupled to the interface board 1130. For example, the main control board 1110, the interface board 1130, the interface board 1140, and the switching board 1120 are connected to a system backplane through a system bus, to implement communication. In a possible implementation, an inter-process communication (IPC) channel is established between the main control board 1110 and the interface board 1130, and the main control board 1110 communicates with the interface board 1130 through the IPC channel.

Logically, the network device 1100 includes a control plane and a forwarding plane. The control plane includes the main control board 1110 and the central processing unit 1131. The forwarding plane includes components that perform forwarding, for example, the forwarding entry memory 1134, the physical interface card 1133, and the network processor 1132. The control plane performs functions such as a function of a router, generating a forwarding table, processing signaling and a protocol packet, and configuring and maintaining a status of a device. The control plane delivers the generated forwarding table to the forwarding plane. On the forwarding plane, the network processor 1132 searches the forwarding table delivered by the control plane to forward a packet received by the physical interface card 1133. The forwarding table delivered by the control plane may be stored in the forwarding entry memory 1134. In some embodiments, the control plane and the forwarding plane may be completely separated, and are not on a same device.

It should be understood that the processing unit 702 in the network device 700 may be equivalent to the central processing unit 1111 or the central processing unit 1131 in the network device 1100.

It should be understood that an operation performed on the interface board 1140 is consistent with an operation performed on the interface board 1130 in this embodiment of this application. For brevity, details are not described. It should be understood that the network device 1100 in this embodiment may correspond to the first network device or the second network device in the foregoing method embodiments. The main control board 1110, the interface board 1130, and/or the interface board 1140 in the network device 1100 may implement functions and/or various steps implemented by the first network device or the second network device in the foregoing method embodiments. For brevity, details are not described herein again.

It should be understood that there may be one or more main control boards. When there are a plurality of main control boards, the main control boards may include an active main control board and a standby main control board. There may be one or more interface boards, and a network device having a stronger data processing capability provides more interface boards. There may also be one or more physical interface cards on the interface board. There may be no switching board or there may be one or more switching boards. When there are a plurality of switching boards, load sharing and redundancy backup may be implemented together. In a centralized forwarding architecture, the network device may not require the switching board, and the interface board provides a function of processing service data of an entire system. In a distributed forwarding architecture, the network device may have at least one switching board, and data exchange between a plurality of interface boards is implemented by using the switching board, to provide a large-capacity data exchange and processing capability. Therefore, a data access and processing capability of a network device in the distributed architecture is better than data access and processing capability of a device in the centralized architecture. Optionally, the network device may alternatively include only one card. That is, there is no switching board. Functions of the interface board and the main control board are integrated on the card. In this case, a central processing unit on the interface board and a central processing unit on the main control board may be combined into one central processing unit on the card, to perform functions obtained by combining the two central processing units. A device in this form (for example, a network device such as a low-end switch or router) has a weak data exchange and processing capability. A specific architecture to be used depends on a specific networking deployment scenario.

In some possible embodiments, the first network device or the second network device may be implemented as a virtualization device. For example, the virtualization device may be a virtual machine (VM) on which a program having a packet sending function is run, and the virtual machine is deployed on a hardware device (for example, a physical server). The virtual machine is a complete computer system simulated by software, having complete hardware system functions, and running in a completely isolated environment. The virtual machine may be configured as the first network device or the second network device. For example, the first network device or the second network device may be implemented based on a general-purpose physical server in combination with a network function virtualization (NFV) technology. The first network device or the second network device is a virtual host, a virtual router, or a virtual switch. Persons skilled in the art may virtualize, by reading this application, the first network device or the second network device having the foregoing function on the general-purpose physical server in combination with the NFV technology. Details are not described herein again.

It should be understood that the network devices in the foregoing product forms separately have any function implemented by the first network device or the second network device in the foregoing method embodiments. Details are not described herein.

An embodiment of this application further provides a chip, including a processor and an interface circuit. The interface circuit is configured to receive instructions and transmit the instructions to the processor. The processor may be configured to perform the foregoing VXLAN packet transmission method. The processor is coupled to a memory. The memory is configured to store a program or instructions. When the program or the instructions are executed by the processor, the chip system is enabled to implement the method in any one of the foregoing method embodiments.

Optionally, there may be one or more processors in the chip system. The processor may be implemented by using hardware, or may be implemented by using software. When being implemented by using the hardware, the processor may be a logic circuit, an integrated circuit, or the like. When being implemented by using the software, the processor may be a general-purpose processor, and is implemented by reading software code stored in the memory.

Optionally, there may be one or more memories in the chip system. The memory may be integrated with the processor, or may be disposed separately from the processor. This is not limited in this application. For example, the memory may be a non-transitory processor, for example, a read-only memory ROM. The memory and the processor may be integrated on a same chip, or may be separately disposed on different chips. A type of the memory and a manner of disposing the memory and the processor are not limited in this embodiment of this application.

For example, the chip system may be a field programmable gate array (FPGA), an application-specific integrated circuit (ASIC), a system on chip (SoC), a central processing unit (CPU), a network processor (NP), a digital signal processing circuit (DSP), a micro controller (MCU), a programmable logic device (PLD), or another integrated chip.

An embodiment of this application further provides a computer-readable storage medium, including instructions and a computer program. When the computer-readable storage medium is run on a computer, the computer is enabled to perform the VXLAN packet transmission method in the foregoing embodiments.

An embodiment of this application further provides a computer program product including instructions or a computer program. When the computer program product runs on a computer, the computer is enabled to perform the VXLAN packet transmission method in the foregoing embodiments.

In the specification, claims, and accompanying drawings of this application, the terms "first", "second", "third", "fourth", and the like (if existent) are intended to distinguish between similar objects but do not necessarily indicate a specific order or sequence. It should be understood that the data used in such a way are interchangeable in proper circumstances, so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, product, or device.

It may be clearly understood by persons skilled in the art that, for convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, the unit division is merely logical service division, and may be other division during actual implementation. For example, a plurality of units or components may be combined or integrated into another system, or some features may be ignored or not performed. In addition, the displayed or discussed mutual couplings, direct couplings, or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of embodiments.

In addition, service units in embodiments of this application may be integrated into one processing unit, or each of the units may exist alone physically, or two or more units are integrated into one unit. The integrated unit may be implemented in a form of hardware, or may be implemented in a form of a software service unit.

When the integrated unit is implemented in a form of a software service unit and sold or used as an independent product, the integrated unit may be stored in a computer-readable storage medium. Based on such an understanding, the technical solutions of this application essentially, or the part contributing to an existing technology, or all or some of the technical solutions may be implemented in the form of a software product. The computer software product is stored in a storage medium, and includes several instructions for instructing a computer device (which may be a personal computer, a server, or a network device) to perform all or some of the steps of the methods described in embodiments of this application. The storage medium includes any medium that can store program code, such as a USB flash drive, a removable hard disk, a read-only memory (ROM), a random access memory (RAM), a magnetic disk, or an optical disc.

Persons of skill in the art should be aware that in one or more of the foregoing examples, the services described in this application may be implemented by using hardware, software, firmware, or any combination thereof. When being implemented by using the software, the services may be stored in a computer-readable medium or transmitted as one or more instructions or code on a computer-readable medium. The computer-readable medium includes a computer storage medium and a communication medium. The communication medium includes any medium that enables a computer program to be transmitted from one place to another place. The storage medium may be any available medium accessible to a general-purpose or dedicated computer.

In the foregoing specific implementations, the purpose, the technical solutions, and the beneficial effects of this application are further described in detail. It should be understood that the foregoing descriptions are merely specific implementations of this application.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. A method, comprising:

obtaining, by a first network device, a first packet;

obtaining, by the first network device, a virtual extensible local area network identifier (VNI) based on the first packet;

encapsulating, by the first network device, an internet protocol version 6 (IPv6) header in the first packet to obtain a second packet, wherein the IPV6 header carries the VNI; and sending, by the first network device, the second packet to a second network device.

2. The method according to claim 1, wherein the IPV6 header is an IPV6 basic header.

3. The method according to claim 2, wherein the VNI is carried in a destination address field of the IPV6 basic header.

4. The method according to claim 3, wherein the 65th bit to the 128th bit in the destination address field carry the VNI.

5. The method according to claim 3, wherein the destination address field comprises a virtual extensible local area network (VXLAN) header, and the VXLAN header carries the VNI.

6. The method according to claim 5, wherein the 65th bit to the 128th bit in the destination address field carry the VXLAN header.

7. The method according to claim 3, wherein a destination address in the destination address field indicates to the second network device to forward the packet based on the VNI carried in the destination address field.

8. The method according to claim 1, wherein the IPV6 header further comprises virtual extensible local area network (VXLAN) flags, and the VXLAN flags comprise a flag indicating that the second packet carries a valid VNI.

9. The method according to claim 1, wherein obtaining, by the first network device, the VNI based on the first packet comprises:

obtaining, by the first network device, the VNI based on an interface on which the first packet is received, wherein the VNI corresponds to the interface on which the first packet is received.

10. A method, comprising:

receiving, by a second network device, a second packet from a first network device, wherein the second packet is encapsulated with an internet protocol version 6 (IPv6) header, and the IPV6 header carries a virtual extensible local area network identifier (VNI);

obtaining, by the second network device, the VNI from the IPV6 header;

decapsulating, by the second network device, the second packet to obtain a first packet, wherein the first packet does not comprise the IPV6 header; and forwarding, by the second network device, the first packet based on the VNI.

11. The method according to claim 10, wherein the IPV6 header is an IPV6 extension header, and the IPV6 extension header comprises a destination option header (DOH) or a segment routing header (SRH).

12. The method according to claim 11, wherein the DOH comprises a type-length-value (TLV), and a type field of the TLV indicates that the DOH carries the VNI.

13. The method according to claim 12, wherein the DOH comprises a virtual extensible local area network (VXLAN) header, and the VXLAN header carries the VNI.

14. The method according to claim 13, wherein the VNI is carried in a segment identifier list (SID list) of the SRH.

15. The method according to claim 14, wherein a type of a segment identifier (SID) of the second network device is a virtual network endpoint (END.VN) type.

16. A network device comprising:

at least one processor; and one or more memories;

wherein the one or more memories store instructions or program code; and wherein the at least processor is configured to execute the instructions or the program code in the one or more memories, to enable the network device to:

obtain a first packet;

obtain a virtual extensible local area network identifier (VNI) based on the first packet, and encapsulate an internet protocol version 6 (IPv6) header in the first packet to obtain a second packet, wherein the IPV6 header carries the VNI; and send the second packet to a second network device.

17. The network device according to claim 16, wherein the IPV6 header is an IPV6 basic header, and the VNI is carried in a destination address field of the IPV6 basic header.

18. The network device according to claim 17, wherein the destination address field comprises a virtual extensible local area network (VXLAN) header, and the VXLAN header carries the VNI.

19. A network device comprising:

at least one processor; and one or more memories;

wherein the one or more memories store instructions or program code; and wherein the at least processor is configured to execute the instructions or the program code in the one or more memories, to enable the network device to:

receive a second packet from a first network device, wherein the second packet is encapsulated with an internet protocol version 6 (IPv6) header, and the IPV6 header carries a virtual extensible local area network identifier (VNI);

obtain the VNI from the IPV6 header, and decapsulate the second packet to obtain a first packet, wherein the first packet does not comprise the IPV6 header; and forward the first packet based on the VNI.

20. The network device according to claim 19, wherein the IPV6 header is an IPV6 extension header, and the IPV6 extension header comprises a destination option header DOH or a segment routing header (SRH).

* * * * *